US008630422B2

(12) United States Patent
Gentry

(10) Patent No.: US 8,630,422 B2
(45) Date of Patent: Jan. 14, 2014

(54) FULLY HOMOMORPHIC ENCRYPTION METHOD BASED ON A BOOTSTRAPPABLE ENCRYPTION SCHEME, COMPUTER PROGRAM AND APPARATUS

(75) Inventor: Craig B. Gentry, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 12/590,584

(22) Filed: Nov. 10, 2009

(65) Prior Publication Data

US 2011/0110525 A1    May 12, 2011

(51) Int. Cl.
*H04L 29/06* (2006.01)
(52) U.S. Cl.
USPC .......................... 380/285; 380/281; 713/193
(58) Field of Classification Search
USPC ........... 380/277, 278, 281, 285; 713/189, 193
See application file for complete search history.

(56) References Cited

U.S. PATENT DOCUMENTS

| | | | |
|---|---|---|---|
| 4,405,829 A | 9/1983 | Rivest et al. | 380/30 |
| 6,530,020 B1* | 3/2003 | Aoki | 713/163 |
| 7,054,444 B1 | 5/2006 | Paillier | 380/30 |
| 7,500,111 B2 | 3/2009 | Hacigumus et al. | 713/193 |
| 7,640,432 B2* | 12/2009 | Gennaro et al. | 713/180 |
| 7,856,100 B2 | 12/2010 | Wang et al. | |
| 7,869,598 B2 | 1/2011 | Kerschbaum | |
| 7,877,410 B2 | 1/2011 | Staddom et al. | |
| 2002/0103999 A1* | 8/2002 | Camnisch et al. | 713/155 |
| 2002/0164035 A1* | 11/2002 | Yokota et al. | 380/278 |
| 2003/0172262 A1* | 9/2003 | Curry | 713/156 |
| 2005/0120233 A1* | 6/2005 | Halcrow et al. | 713/193 |
| 2005/0193048 A1 | 9/2005 | Vaudenay et al. | 708/400 |
| 2006/0015946 A1* | 1/2006 | Yagawa | 726/32 |
| 2006/0262933 A1* | 11/2006 | Furukawa | 380/281 |
| 2008/0226066 A1* | 9/2008 | Yi et al. | 380/47 |
| 2008/0294909 A1 | 11/2008 | Ostrovsky et al. | 713/189 |
| 2009/0062942 A1 | 3/2009 | Smaragdis et al. | 700/94 |
| 2009/0103721 A1 | 4/2009 | Sada et al. | 380/42 |
| 2009/0138459 A1* | 5/2009 | Walter et al. | 707/5 |
| 2009/0268908 A1 | 10/2009 | Bikel et al. | 380/255 |
| 2009/0327748 A1 | 12/2009 | Agrawal et al. | 713/189 |
| 2010/0329448 A1 | 12/2010 | Rane et al. | 380/28 |
| 2011/0110525 A1 | 5/2011 | Gentry | 380/285 |
| 2012/0039473 A1 | 2/2012 | Gentry et al. | 380/277 |
| 2012/0066510 A1 | 3/2012 | Weinman | 713/189 |

OTHER PUBLICATIONS

C.A. Melchor, G. Castagnos, and P. Gaborit. Lattice-based homomorphic encryption of vector spaces. In *IEEE International Symposium on Information Theory, ISIT'2008*, pp. 1858-1862, 2008.

(Continued)

*Primary Examiner* — Hadi Armouche
(74) *Attorney, Agent, or Firm* — Harrington & Smith; Preston J. Young

(57) ABSTRACT

A method includes encrypting information in accordance with an encryption scheme that uses a public key; encrypting a plurality of instances of a secret key, each being encrypted using at least one additional instance of the public key; sending the encrypted information and the plurality of encrypted instances of the secret key to a destination; receiving an encrypted result from the destination; and decrypting the encrypted result. A further method includes receiving a plurality of encrypted secret keys and information descriptive of a function to be performed on data; converting the information to a circuit configured to perform the function on the data; and applying the data to inputs of the circuit and evaluating the data using, in turn, the plurality of encrypted secret keys.

15 Claims, 6 Drawing Sheets

(56) References Cited

OTHER PUBLICATIONS

C.A. Melchor, P. Gaborit, and J. Herranz. Additively Homomorphic Encryption with $t$-Operand Multiplications. Technical Report 2008/378, IACR ePrint archive, 2008. Available at http://eprint.iacr.org/2008/378/.

M. Ajtai. Generating Hard Instances of the Short Basis Problem. *ICALP'99*, LNCS 1644, pp. 1-9, 1999.

J. Alwen and C. Peikert. Generating Shorter Bases for Hard Random Lattices. In *STACS*, pp. 75-86, 2009.

D. Boneh, E.-J. Goh, and K. Nissim. Evaluating 2-DNF Formulas on Ciphertexts. (TCC '05, LNCS 3378, pp. 325-341, 2005), 2006.

Y. Dodis, S. Goldwasser, Y. Kalai, C. Peikert, and V. Vaikuntanathan. Public-Key Encryption Schemes with Auxiliary Inputs. In *TCC*, pp. 361-381, 2010.

C. Gentry. *A Fully Homomorphic Encryption Scheme*. Dissertation, Stanford University, 2009. Available at http://crypto.stanford.edu/craig.

C. Gentry. Fully Homomorphic Encryption Using Ideal Lattices. In *Proc. of STOC '09*, pp. 169-178. ACM, 2009.

C. Gentry, C. Peikert, and V. Vaikuntanathan. Trapdoors for Hard Lattices and New Cryptographic Constructions. (In *STOC*, pp. 197-206, 2008), 2007.

A. Kawachi, K. Tanaka, and K. Xagawa. Multi-bit Cryptosystems Based on Lattice Problems. In *Public Key Cryptography (PKC'07)*, LNCS 4450, pp. 315-329. Springer, 2007.

Y. Lindell and B. Pinkas. A Proof of Yao's Protocol for Secure Two-Party Computation. (*J. Cryptology*, 22(2), 2009), 2004.

C. Peikert. Public-Key Cryptosystems from the Worst-Case Shortest Vector Problem. In *STOC'09*, pp. 333-342. ACM, 2009.

O. Regev. On Lattices, Learning with Errors, Random Linear Codes, and Cryptography. *J. ACM*, 56(6), 2009. Preliminary version in *Proc. of STOC'05*, pp. 84-93, 2005.

T. Sander, A. Young, and M. Yung. Non-Interactive CryptoComputing for $NC^1$. In *40th Annual Symposium on Foundations of Computer Science*, pp. 554-567. IEEE, 1999.

A. C. Yao. Protocols for Secure Computations (extended abstract). In *23rd Annual Symposium on Foundations of Computer Science—FOCS '82*, pp. 160-164. IEEE, 1982.

J. Domingo-Ferrer. "A Provably Secure Additive and Multiplicative Privacy Homomorphism." Information Security. 5th International Conference, ISC 2002 Proceedings, pp. 471-483, 2002.

Henry. The Theory and Applications of Homomorphic Cryptography. Dissertation, University of Waterloo, 2008.

J. Black, P. Rogaway, T. Shrimpton. Encryption-Scheme Security in the Presence of Key-Dependent Messages. In Proc. of SAC '02, LNCS 2595. Springer, pp. 62-75, 2002.

M. Blaze, G. Bleumer, M. Strauss. Divertible Protocols and Atomic Proxy Cryptography. Eurocrypt '98. LNCS 1403, pp. 127-144, 1998.

D. Boneh, S. Halevi, M. Hamburg, R. Ostrovsky. Circular-Secure Encryption from Decision Diffe-Hellman. In Proc. of Crypto '08, LNCS 5157, pp. 108-125, 2008.

R. Canetti, O. Goldreich, S. Halevi. The Random Oracle Methodology, Revisited. (Extended abstract in *Proc. of the 30th ACM Symp. On Theory of Computing (STOC)*, pp. 209-218, 1998), 2002.

Y. Ishai, A. Paskin. Evaluating Branching Programs on Encrypted Data. In Proc. of TOC '07, 2007.

M. Naor, K. Nissim. Communication Preserving Protocols for Secure Function Evaluation. In Proc. of STOC '01, pp. 590-599, 2001.

R. Ostrovsky, W.E. Skeith III. Private Searching on Streaming Data. (Preliminary Version in Proc. of Crypto '05. LNCS 3621, pp. 223-240, 2005.) *J. Cryptology*, vol. 20:4, pp. 397-430, Nov. 2006, Oct. 2007 (two versions provided).

R.L. Rivest, L. Adelman, M.L. Dertouzos. On Data Banks and Privacy Homomorphisms. In Foundations of Secure Computation, pp. 169-180, 1978.

R.L. Rivest, A. Shamir, L. Adelman. A Method for Obtaining Digital Signatures and Public-Key Cryptosystems. In Comm. of the ACM, 21.2, pp. 120-126, 1978.

IBM Researcher Solves Longstanding Cryptographic Challenge. IBM Press Release (available online), Jun. 25, 2009.

Homomorphic Encryption. IBM Research, Security (available online), Accessed Sep. 28, 2009.

Homomorphic encryption. Wikipedia, accessed Sep. 30, 2009.

U.S. Appl. No. 12/749,944. Halevi et al., "An Efficient Homomorphic Encryption Scheme for Bilinear Forms." Filed Mar. 30, 2010.

R. Cramer, I. Damgaard, J.B. Nielsen. Multiparty Computation from Threshold Homomorphic Encryption. In Proc. of Crypto '01, LNCS 2045, pp. 279-298, 2001.

M. Franklin, S. Haber. Joint Encryption and Message-Efficient Secure Computation. J. Cryptology, 9(4), pp. 217-232, 1996.

O. Goldreich, S. Micali, A. Wigderson. How to Play Any Mental Game—A Completeness Theorem for Protocols with Honest Majority. J. of the ACM, vol. 38, No. 1, pp. 691-729, 1991. Preliminary Version in FOCS '86.

O. Goldreich, R. Ostrovsky. Software Protection and Simulation on Oblivious RAMs. JACM, 1996.

S. Goldwasser, Y.T. Kalai, G.N. Rothblum. One-Time Programs. In Proc. of Crypto '08. Springer, LNCS 5157, pp. 39-56, 2008.

S. Halevi, H. Krawczyk. Security Under Key-Dependent Inputs. In Proc. of ACM CCS'07, 2007.

F. Armknecht and A.-R. Sadeghi. A New Approach for Algebraically Homomorphic Encryption. Cryptology ePrint Archive: Report 2008/422, 2008.

S. Arora, C. Lund, R. Motwani, M. Sudan, and M. Szegedy. Proof Verification and the Hardness of Approximation Problems. J. of the ACM, vol. 45, No. 3, pp. 501-555, 1998.

D. Barrington. Bounded-Width Polynomial-Size Branching Programs Recognize Exactly Those Languages in $NC^1$. In Proc. of STOC '86, pp. 1-5, 1986.

D. Beaver. Minimal-Latency Secure Function Evaluation. In Proc. of Eurocrypt '00, pp. 335-350. Springer, 2000.

J.D.C. Benaloh. Verifiable Secret-Ballot Elections. Ph.D. thesis, Yale Univ., Dept. of Comp. Sci., 1988.

D. Boneh, R. Lipton. Searching for Elements in Black-Box Fields and Applications. In Proc of Crypto '96, LNCS 1109, pp. 283-297. Springer, 1996.

E.F. Brickell and Y. Yacobi. On Privacy Homomorphisms. In Proc. of Eurocrypt '87, LNCS 304, pp. 117-125. Springer, 1988.

R. Canetti, S. Hohenberger. Chosen-Ciphertext Secure Proxy Re-Encryption. In Proc. of ACM CCS '07, 2007.

W. van Dam, S. Hallgren, L. Ip. Quantum Algorithms for some Hidden Shift Problems. In Proc. of SODA '03, pp. 489-498, 2003. Full version in SIAM J. Comput. 36(3): pp. 763-778, 2006.

I. Damgard, M.J. Jurik. A Length-Flexible Threshold Cryptosystem with Applications. ACISP '03, LNCS 2727, pp. 350-356, 2003.

I. Damgard, J.B. Nielsen. Universally Composable Efficient Multiparty Computation from Threshold Homomorphic Encryption. In Proc. of Crypto '03, LNCS 2729, pp. 247-264. Springer, 2003.

M. van Dijk, S. Devadas. Interval Obfuscation. To be published as an MIT-CSAIL Technical Report in 2009.

I.B. Damgard, M.J. Jurik. A Length-Flexible Threshold Cryptosystem with Applications. BRICS Report Series, RS-03-16, ISSN 0909-0878, 2003.

T. ElGamal. A Public Key Cryptosystem and a Signature Scheme Based on Discrete Logarithms. Trans. on Info. Theory, vol. IT-31, No. 4, pp. 469-472, Jul. 1985.

M.R. Fellows, N. Koblitz. Combinatorial Cryptosystems Galore! in Contemporary Mathematics, vol. 168 of Finite Fields: Theory, Applications, and Algorithms, FQ2, pp. 51-61, 1993.

S. Goldwasser, D. Kharchenko. Proof of Plaintext Knowledge for the Ajtai-Dwork Cryptosystem. In Proc. of TCC 2005, pp. 529-555, 2005.

S. Goldwasser, S. Micali. Probabilistic Encryption & How to Play Mental Poker Keeping Secret All Partial Information. In Proc of STOC '82, pp. 365-377, 1982.

J. Kilian. A Note on Efficient Zero-Knowledge Proofs and Arguments. In Proc. of STOC '92, pp. 723-732, 1992.

J. Kilian. Improved Efficient Arguments. In Proc. of Crypto '95, LNCS 963, pp. 311-324, 1995.

(56) References Cited

OTHER PUBLICATIONS

F. Levy-dit-Vehel and L. Perret. A Polly Cracker system based on Satisfiability. In Coding, Crypt. and Comb., Prog. in Comp. Sci. and App. Logic, v. 23, pp. 177-192, 2003.
H. Lipmaa. An Oblivious Transfer Protocol with Log-Squared Communication. In Proc. of ICS '05 pp. 314-328, 2005.
L. Van Ly. Polly Two—A Public-Key Cryptosystem based on Polly Cracker, Ph.D. thesis, Ruhr-University at Bochum, Bochum, Germany 2002.
L. Van Ly. Polly two : a new algebraic polynomial-based Public-Key Scheme. AAECC, 17: 267-283, 2006.
U. Maurer, D. Raub. Black-Box Extension Fields and the Inexistence of Field-Homomorphic One-Way Permutations. Asiacrypt '07, pp. 427-443, 2007.
C.A. Melchor, G. Castagnos, and P. Gaborit. Lattice-based homomorphic encryption of vector spaces. ISIT '08, pp. 1858-1862, 2008.
C.A. Melchor, P. Gaborit, and J. Herranz. Additive Homomorphic Encryption with $d$-Operand Multiplications. Eprint 2008/378, 2008.
D. Naccache, J. Stern. A New Public Key Cryptosystem Based on Higher Residues. ACM CCS '98, 1998.
T. Okamoto, S. Uchiyama. A New Public-Key Cryptosystem as Secure as Factoring. Eurocrypt '98, LNCS 1403, pp. 308-318, 1998.
P. Paillier. Public-Key Cryptosystems Based on Composite Degree Residuosity Classes. Eurocrypt '99, pp. 223-238, 1999.
C. Peikert, B. Waters. Lossy Trapdoor Functions and Their Applications. STOC '08, pp. 187-196, 2008.
A.C-C. Yao. How to Generate and Exchange Secrets. FOCS '86, pp. 162-167, 1986.
C. Peikert, B. Waters. Lossy Trapdoor Functions and Their Applications. (41 pp.), 2008.
Gentry. "A Fully Homomorphic Encryption Scheme." [online] published 2009 [retrieved on Jul. 5, 2012 1 Retrieved from the Internet <URL: http://cs.au.dk/—stm/local-cache/gentry-thesis.pdf> entire document (especially p. 2-3, 8-9, 44, 128, 189).
Dijk et al. http://csis.bits-pilani.ac.in/faculty/murali/netsec-11/seminadrefs/jaldeepl.pdf [online] published Jun. 2010. [retrieved on Jul. 5, 2012] Retrieved from the Internet <URL: http://csis.bits-pilani.acin/faculty/murali/netsec-11/seminar/refs/jaldeepl.pdf> entire document.
International Search Report for corresponding International Patent Application No. PCT/US 12/35558 mailed Jul. 12, 2012.
Gama, Nicolas, et al., "Predicting Lattice Reduction", In Advances in Cryptology—EUROCRYPT '08, vol. 4965 of Lecture Notes in Computer Science, pp. 31-51, 2008.
Gentry, Craig, "Toward Basing Fully Homomorphic Encryption on Worst-Case Hardness", In Advances in Cryptology—CRYPTO '10, vol. 6223 of Lecture Notes in Computer Science, 22 pgs., 2010.
Goldreich, Oded, et al., "Public-Key Cryptosystems from Lattice Reduction Problems", In Advances in Cryptology—CRYPTO '97, vol. 1294 of Lecture notes in Computer Science, pp. 112-131, 1997.
Lyubashevsky, Vadim, et al., On Ideal Lattices and Learning with Errors Over Rings. In Advances in Cryptology—EUROCRYPT '10, vol. 6110 of Lecture Notes in Computer Science, pp. 1-23, 2010.
Micciancio, Daniels, "Improving Lattice Based Cryptosystems Using the Hermite Normal Form", In CaLC '01, vol. 2146 of Lecture Notes in Computer Science, pp. 126-145, 2001.
Peikert, Christ et al., "Lattices that Admit Logarithmic Worst-Case to Average-Case Connection Factors", In Proceedings of the $39^{th}$ Annual ACM Symposium on Theory of Computing STOC'07, pp. 478-487, Apr. 4, 2007.

Schnorr, C.P., "A Hierarchy of Polynomial Time Lattice Basis Reduction Algorithms", Theor. Comput. Sci., 53.201, pp. 201-224, 1987.
Schoup, NTL: A Library for doing Number Theory, http://shoup.net/ntl/; Version 5.5.2, Nov. 2010.
Smart, Nigel P., et al., "Fully Homomorphic Encryption with Relatively Small Key and Ciphertext Sizes", In Public Key Crypotography—PKC'10, vol. 6056 of Lecture Notes in Computer Science, pp. 420-443, 2010.
Stehle, Damien, et al., "Faster Fully Homomorphic Encryption", Crypotology ePrint Archive, Report 2010/399, http://eprint.iacr.org/; 25 pgs. 2010.
Applebaum, Benny, et al., "Fast Cryptographic Primitives and Circular-Secure Encryption Based on Hard Learning Problems", CRYTPO, vol. 5677 of Lecture Notes in Computer Science, pp. 595-618, 2009.
Brakerski, Zvika, et al., Efficient Fully Homomorphic Encryption from (Standard) LWE, FOCS, http://eprint.iacr.org/; 37 pgs. 2011.
Brakerski, Zvika, et al., "Fully Homomorphic Encryption from Ring-LWE and Security for Key Dependent Messages", CRYPTO, 2011, 20 pgs.
Coron, Jean-Sebastien, et al., "Fully Homomorphic Encryption over the Integers with Shorter Public Keys", CRYPTO, 2011, 24 pgs.
Gentry, Craig et al., "Fully Homomorphic Enryption without Squashing Using Depth-3 Arithmetic Circuits", FOCS, http://eprint.iacr.org/; 2011, 21 pgs.
Gentry, Craig, et al., "Implementing Gentry's Fully-Homomorphic Encryption Scheme", EUROCRYPT, vol. 0632, Lecture notes in Computer Science, 2011, pp. 129-148.
Gentry, Craig, et al., "Fully Homomorphic Encryption with Polylog Overhead", http://eprint.iacr.org/; 2011, 32 pgs.
Lauter, Kristin, et al., "Can Homomorphic Encryption be Practical?", ACM, 2011, 11 pgs.
Melchor, Carlos Aguilar, et al., "Additively Homomorphic Enryption with d-Operand Multiplications", CRYPTOm vik, 6223, Lecture Notes in Computer Science, 2010, pp. 138-154.
Regev, Oded, "The Learning with Errors Problem", IEEE, 2010, pp. 191-204.
Smart, N.P. et al., "Fully Homomorphic SIMD Operations", http://eprint.iacr.org/; 2011, 19 pgs.
Stehle, Damien, et al., "Faster Fully Homomorphic Encryption", ASIACRYPT, vol. 6477, Lecture Notes in Computer Science, 2010, pp. 377-394.
Chunsheng, Gu, "New fully Homomorphic Encryption over the Integers", School of Computer Engineering, Jiangsu Teachers Univ. of Technology, Mar. 2011, 9 pgs.
Dodis, Yevgeniy, et al., "Cryptography Against Continuous Memory Attacks", IEEE 2010, pp. 511-520.
Avanzi, Roberto M., "Fast Evaluation of Polynomials With Small Coefficients Modulo an Integer", http://caccioppoli.mac.rub.de/website/papers/trick.pdf; 2005, 5 pgs.
Gentry, Craig, et al., "Public Challenges for Fully-Homomorphic Encryption", TBA, 2010, 2 pgs.
Micciancio, Daniele, "Generalized Compact Knapsacks, Cyclic Lattices, and Efficient One-Way Functions", Computational Complexity 16(4), Dec. 2007, pp. 365-411.
Paterson, Michael S., et al., "On the Number of Nonscalar Multiplications Necessary to Evaluate Polynomials", SIAM Journal on Computing, 2(1), pp. 60-66, 1973.
Granlund, Torbjorn, et al., "The GNU MP Multiple Precision Arithmetic Library", Version 5.0.1, Feb. 2010, 144 pgs.
W. Feller; "An Introduction to Probability Theory and Its Applications"; vol. 1, 3rd Ed.; 1968; whole document; Wiley.

* cited by examiner

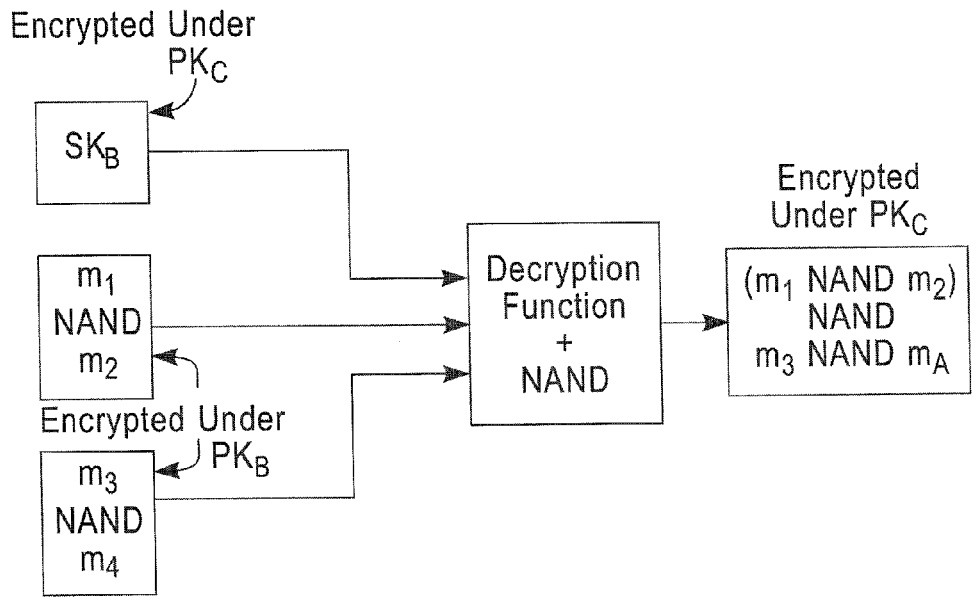

FIG. 5

Theorem (informal) for circuits of arbitrary depth:

- Assume scheme E is bootstrappable - i.e., it evaluates its own decrytion circuit augmented by gates in $\Gamma$.
- Then, there is a scheme $E_\delta$ that evaluates arbitrary circuits of depth $\delta$ with gates in $\Gamma$.
- Ciphertexts: Same size in $E_\delta$ as in E.
  Public key:
    - Contains $(\delta+1)$ E pub keys: $pk_0, ..., pk_\delta$
    - Along with $\delta$ encryped secret keys: $\{Enc(pk_i, sk_{(i-1)})\}$
    - Linear in $\delta$.
    - Constant in $\delta$, if it is assumed the encryption is "circular secure."

FIG. 6

FULLY HOMOMORPHIC ENCRYPTION METHOD BASED ON A BOOTSTRAPPABLE ENCRYPTION SCHEME, COMPUTER PROGRAM AND APPARATUS

FIELD OF THE INVENTION

This invention relates generally to encryption and decryption algorithms and apparatus and, more specifically, to homomorphic encryption algorithms and apparatus.

BACKGROUND OF THE INVENTION

A fully homomorphic encryption scheme may be considered as one that allows the computation of arbitrary functions over encrypted data without requiring the use of a decryption key.

There has existed an open problem of constructing a fully homomorphic encryption scheme. This notion, originally called a privacy homomorphism, was introduced by Rivest, Adleman and Dertouzous (R. Rivest, L. Adleman, and M. Dertouzous. On data banks and privacy homomorphisms. In Foundations of Secure Computation, pages 169-180, 1978) shortly after the development of RSA by Rivest, Shamir, and Adleman (R. Rivest, A. Shamir, and L. Adleman. A method for obtaining digital signatures and public-key cryptosystems. In Comm. of the ACM, 21:2, pages 120-126, 1978). Basic RSA is a multiplicatively homomorphic encryption scheme, i.e., given RSA public key pk=(N,e) and ciphertexts $\{\psi_i \leftarrow \pi_i^e \mod N\}$, one can efficiently compute $\Pi_i \psi_i = (\Pi_i \pi_i)^e \mod N$, a ciphertext that encrypts the product of the original plaintexts. One may assume that it was RSA's multiplicative homomorphism, an accidental but useful property, that led Rivest et al. to ask a natural question: What can one do with an encryption scheme that is fully homomorphic: a scheme $\epsilon$ with an efficient algorithm $\text{Evaluate}_\epsilon$ that, for any valid public key pk, any circuit C (not just a circuit consisting of multiplication gates as in RSA), and any ciphertexts $\psi_i \leftarrow \text{Encrypt}_\epsilon(pk,\pi_i)$, outputs $$\psi \leftarrow \text{Evaluate}_\epsilon(pk,C,\psi_1,\ldots,\psi_t),$$

a valid encryption of $C(\pi_1,\ldots,\pi_t)$ under pk? Their answer: one can arbitrarily compute on encrypted data, i.e., one can process encrypted data (query it, write into it, do anything to it that can be efficiently expressed as a circuit) without the decryption key. As an application, they suggested private data banks. A user can store its data on an untrusted server in encrypted form. Later, the user can send a query on the data to the server, whereupon the server can express this query as a circuit to be applied to the data, and use the $\text{Evaluate}_\epsilon$ algorithm to construct an encrypted response to the user's query, which the user then decrypts. One would obviously want the server's response here to be more concise than the trivial solution, in which the server just sends all of the encrypted data back to the user to process on its own.

It is known that one can construct additively homomorphic encryption schemes from lattices or linear codes. The lattice-based scheme and the Reed-Solomon-code-based scheme allow multiplications, though with exponential expansion in ciphertext size. Ciphertexts implicitly contain an "error" that grows as ciphertexts are added together. Thus, ciphertexts output by Evaluate do not have the same distribution as ciphertexts output by Encrypt, and at some point the error may become large enough to cause incorrect decryption. For this reason, the homomorphism is sometimes referred to as a "pseudohomomorphism" or a "bounded homomorphism"

There are schemes that use a singly homomorphic encryption scheme to construct a scheme that can perform more complicated homomorphic operations (T. Sander, A. Young, and M. Yung. Non-interactive cryptocomputing for NC1. In Proc. of FOCS '99, pages 554-567, 1999, and Y. Ishai and A. Paskin. Evaluating Branching Programs on Encrypted Data. In Proc. of TCC '07. Sanders, Young and Yung (SYY) show that one can use a circuit-private additively homomorphic encryption scheme to construct a circuit-private scheme that can handle arbitrary circuits, where the ciphertext size increases exponentially with the depth of the circuit. Their scheme may, therefore, feasibly evaluate NC1 circuits. Ishai and Paskin show how to evaluate branching programs, and with much smaller ciphertexts than SYY. In their scheme Evaluate outputs a ciphertext whose length is proportional to the length of the branching program. This remains true even if the size of the branching program is very large, e.g., super-polynomial. However, the computational complexity of their scheme is proportional to the size.

In more detail, Ishai and Paskin use a "leveled" approach to evaluate a branching program. A (deterministic) branching program (BP) P is defined by a DAG from a distinguished initial node in which each nonterminal node has two outgoing edges labeled 0 and 1, and where the terminal nodes also have labels.

Cryptographers have accumulated an assortment of applications for fully homomorphic encryption since then. However, until now, there was no viable construction of a fully homomorphic encryption scheme.

SUMMARY

The foregoing and other problems are overcome by the use of the exemplary embodiments of this invention.

In a first aspect thereof the exemplary embodiments of this invention provide a method that comprises encrypting information in accordance with an encryption scheme that uses a public key; encrypting a plurality of instances of a secret key, each being encrypted using at least one additional instance of the public key; sending the encrypted information and the plurality of encrypted instances of the secret key to a destination; receiving an encrypted result from the destination; and decrypting the encrypted result.

In a further aspect thereof the exemplary embodiments of this invention provide a method that comprises receiving a plurality of encrypted secret keys and information descriptive of a function to be performed on data; converting the information to a circuit configured to perform the function on the data; and applying the data to inputs of the circuit and evaluating the data using, in turn, the plurality of encrypted secret keys.

In a further aspect thereof the exemplary embodiments of this invention provide a method that comprises receiving second information comprising first information encrypted under a second public key of an encryption scheme, where the first information comprises original information encrypted under a first public key of the encryption scheme, where the encryption scheme uses public key and secret key pairs and includes an encryption function, a decryption function and an evaluation function, where the encryption function operates to encrypt data using a certain public key, where the decryption function operates to decrypt data encrypted using the certain public key by using a certain secret key to obtain the data, where the encryption scheme is operable to evaluate at least one of the decryption function and an augmented version of the decryption function, where the augmented version of the decryption function comprises a circuit having at least two copies of the decryption function as inputs for a gate; receiving a first secret key encrypted under the second public key, where the first secret key corresponds to the first public key; and evaluating the second information by operating the evaluation function, where the evaluation function receives as inputs the second information, the first secret key encrypted under the second public key, the second public key and an input circuit, where the evaluation function outputs third information comprising the original information encrypted under the second public key of the encryption scheme.

In a further aspect thereof the exemplary embodiments of this invention provide a program storage device readable by a machine and tangibly embodying a program of instructions executable by the machine for performing operations that comprise encrypting information in accordance with an encryption scheme that uses a public key; encrypting a plurality of instances of a secret key, each being encrypted using at least one additional instance of the public key; sending the encrypted information and the plurality of encrypted instances of the secret key to a destination; receiving an encrypted result from the destination; and decrypting the encrypted result.

In a further aspect thereof the exemplary embodiments of this invention provide a program storage device readable by a machine and tangibly embodying a program of instructions executable by the machine for performing operations that comprise receiving a plurality of encrypted secret keys and information descriptive of a function to be performed on data; converting the information to a circuit configured to perform the function on the data; and applying the data to inputs of the circuit and evaluating the data using, in turn, the plurality of encrypted secret keys.

BRIEF DESCRIPTION OF THE DRAWINGS

FIG. 5 shows another example of homomorphically evaluating the decryption circuit augmented with an operation, such as the NAND logic function.

FIG. 6 illustrates an informal theorem for circuits of arbitrary depth.

Figure 1:
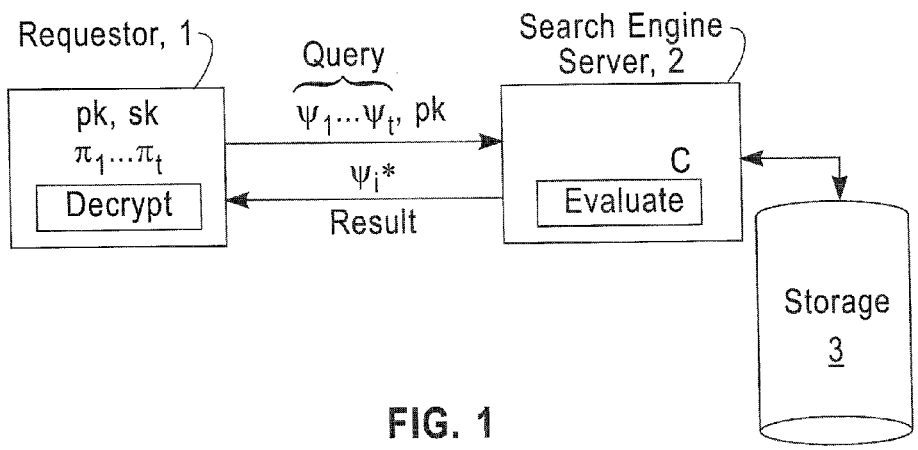
FIG. 1 illustrates a simple block diagram of a requestor and a server, such as a search engine, that use the fully homomorphic encryption scheme constructed from a bootstrappable encryption scheme in accordance with the exemplary embodiments of this invention.

DETAILED DESCRIPTION OF THE
EXEMPLARY EMBODIMENTS OF THIS
INVENTION

In accordance with the exemplary embodiments of this invention, an "initial" encryption scheme is created that is somewhat homomorphic, i.e., it can compute shallow circuits. Then, techniques are provided that allow constructing a fully homomorphic encryption scheme from the somewhat homomorphic encryption scheme. The initial technique may be referred to as bootstrapping. That is, a bootstrappable encryption scheme is one wherein the encryption scheme can evaluate its own decryption circuit (e.g., slightly augmented versions of its own decryption circuit). It is shown that if the decryption circuit of a somewhat homomorphic encryption scheme is shallow enough, in particular, if it is shallow enough to be evaluated homomorphically by the somewhat homomorphic scheme itself (a self-referential property), then this somewhat homomorphic scheme becomes "bootstrappable", and can be used to construct a fully homomorphic scheme that can evaluate circuits of arbitrary depth.

The somewhat homomorphic scheme itself improves upon prior work; in particular, it allows an essentially arbitrary number of addition operations while allowing up to O(log log α) multiplicative depth, where $$\alpha = 2^{n^{O(1)}}$$

is the approximation factor for the lattice problem underlying the scheme's security. The somewhat homomorphic scheme is more efficient than the fully homomorphic one, i.e., it requires less work per gate of the circuit since it does not require the computation associated with the bootstrapping.

Described below is a fully homomorphic encryption scheme that solves a central open problem in cryptography. Such a scheme allows one to compute arbitrary functions over encrypted data without the decryption key, i.e., given encryptions $E(m_1), \ldots, E(m_t)$ of $m_1, \ldots m_t$, one can efficiently compute a compact ciphertext that encrypts $f(m_1, \ldots m_t)$ for any efficiently computable function $f$. This problem was posed by Rivest et al. in 1978.

Fully homomorphic encryption has numerous applications. For example, it enables private search engine queries where the search engine responds to a query without knowledge of the query, i.e., a search engine can provide a succinct encrypted answer to an encrypted (Boolean) query without knowing what the query was. It also enables searching on encrypted data; one can store encrypted data on a remote server and later have the server retrieve only files that (when decrypted) satisfy some Boolean constraint, even though the server cannot decrypt the files on its own. More broadly, fully homomorphic encryption improves the efficiency of secure multiparty computation.

Provided below is a somewhat homomorphic "boostrappable" encryption scheme that is operable when the function $f$ is the scheme's own decryption function. It is then shown, through recursive self-embedding, how bootstrappable encryption gives fully homomorphic encryption.

By way of introduction, assume the presence of an encryption scheme with a "noise parameter" attached to each ciphertext, where encryption outputs a ciphertext with small noise, say less than n, but decryption works as long as the noise is less than some threshold N>>n. Furthermore, assume the presence of algorithms Add and Mult that can take ciphertexts E(a) and E(b) and compute E(a+b) and E(a*b), but at the cost of adding or multiplying the noise parameters. This immediately gives a "somewhat homomorphic" encryption scheme that can accommodate circuits of depth roughly log log N−log log n.

Next assume the presence of an algorithm Recrypt that takes a ciphertext E(a) with noise N'<N and outputs a "fresh"

ciphertext E(a) that also encrypts a, but which has noise parameter smaller than $\sqrt{N}$. This Recrypt algorithm is sufficient to construct a fully homomorphic scheme from the somewhat homomorphic one. In particular, before Add or Mult E(a) and E(b), one can apply Recrypt to E(a) and E(b) to ensure that their noise parameters are small enough so that the noise parameter of E(a*b) is less than N, and so on recursively.

A somewhat homomorphic encryption scheme is first provided. Then it is shown how to modify the somewhat homomorphic encryption scheme so that its decryption circuit has multiplicative depth at most log log N−log log n−1, i.e., less depth than what the scheme can accommodate. It is shown to be the case that a somewhat homomorphic encryption scheme that has this self-referential property of being able to handle circuits that are deeper than its own decryption circuit, in which it can be said that the somewhat homomorphic encryption scheme is "bootstrappable", is sufficient to obtain the Recrypt algorithm, and thereby provide fully homomorphic encryption.

Consider the following secret key encryption scheme which merely uses integers. The key is an odd integer p>2N. An encryption of a bit b is simply a random multiple of p, plus a random integer B with the same parity as b, i.e., B is even if b=0 and is odd if b=1. More specifically, the ciphertext is c=b+2x−kp, where X is a random integer in (−n/2,n/2), and k is an integer chosen from some range. One decrypts by setting b←(c mod p)mod 2, where (c mod p) is the number in (−p/2, p/2) that equals c modulo p. Actually, (c mod p), which is the "noise parameter" in this scheme, will be in [−n,n], since b+2x is in that range. However, decryption would have worked correctly as long as b+2x∈[−N,N] ⊂ (−p/2,p/2). It can be noted that computing c mod p can be done by a very shallow circuit, with depth logarithmic in the bit-lengths of c and p.

Now consider what occurs when two ciphertexts are added, i.e., there is obtained a ciphertext that has a similar format to the originals. Specifically, $$c \leftarrow c_1 + c_2 = b_1 + b_2 + 2(x_1 + x_2) + (k_1 + k_2)p = b_1 \oplus b_2 + 2x + kp$$

for some integers x and k. Decryption recovers $b_1 \oplus b_2$ as long as $(b_1+2x_1)+(b_2+2x_2) \in [-N,N]$. Multiplication also gives ciphertexts with a similar format.

$$c \leftarrow c_1 * c_2 = b_1 * b_2 + 2(b_1 x_2 + b_2 x_1 + 2x_1 x_2) + kp = b_1 * b_2 + 2x + k$$

for some integers x and k. Decryption is workable whenever $(b_1+2x_1)*(b_2+2x_2) \in [-N,N]$.

Assume that there are good and bad representations of p, such that the bad representation can be used in encryption but cannot be used to distinguish whether an integer is close to a multiple of p or is uniform modulo p. A question that arises is how to prove security? If there is an adversary A that can break semantic security, B uses A to decide which distribution an integer M comes from as follows: give A the challenge ciphertext c=b+2m+kp for random k. If M is close to a multiple of p, then so is 2m, and the closest p-multiple is an even distance away; in particular, b+2m∈[−N,N] mod p and b+2m mod p=b, the challenge ciphertext decrypts correctly to b, and A should guess b with non-negligible advantage. But if m is uniform modulo p, then so is 2m (since p is odd), C is independent of b, and A has no advantage. Basically, B can distinguish the distribution that m came from by observing whether A guesses correctly with non-negligible advantage.

The exemplary embodiments of this invention enable the constructions of a fully homomorphic encryption scheme ϵ. At a high-level, the essence of fully homomorphic encryption is as follows: given ciphertexts that encrypt $\pi_1, \ldots, \pi_t$, fully homomorphic encryption should allow anyone (not just the key-holder) to output a ciphertext that encrypts $f(\pi_1, \ldots, \pi_t)$ for any desired function $f$, as long as that function can be efficiently computed. No information about $\pi_1, \ldots, \pi_t$ or $f(\pi_1, \ldots, \pi_t)$ or any intermediate plaintext values, should leak; i.e., the inputs, output and intermediate values are encrypted.

Formally, there are different ways of defining what it means for the final ciphertext to "encrypt" $f(\pi_1, \ldots, \pi_t)$. The minimal requirement is correctness. A fully homomorphic encryption scheme ϵ should have an efficient algorithm Evaluate$_\epsilon$ that, for any valid ϵ key pair (sk,pk), any circuit C, and any ciphertexts $\psi_i \leftarrow \text{Encrypt}_\epsilon(pk, \pi_i)$, outputs $$\psi \leftarrow \text{Evaluate}_\epsilon(pk, C, \psi_1, \ldots, \psi_t) \text{ such that } \text{Decrypt}_\epsilon(sk, \psi) = C(\pi_1, \ldots, \pi_t)$$

This minimal requirement, however, may not be sufficient, since it permits the trivial solution where $\psi$ simply consists of $(C, \psi_1, \ldots, \psi_t)$—i.e., where the Evaluate$_\epsilon$ algorithm does not "process" the input ciphertexts at all.

There are different ways of excluding the trivial solution. One way is to require circuit privacy, i.e., (roughly) that the output of Evaluate E reveals nothing (at least computationally) about the circuit C that it took as input. If circuit privacy is the only additional requirement, then fully homomorphic encryption (under this definition) can be achieved by using a two-flow oblivious transfer (OT) protocol in combination with Yao's garbled circuit (A. C. Yao. Protocols for secure computations (extended abstract). FOCS '82, pages 80-91, A. C. Yao. How to generate and exchange secrets. FOCS '86, pages 162-167.) Typically two-flow OT protocols use an additively homomorphic encryption scheme, and the OT query consists of a ciphertext $\psi$ in this encryption scheme. In the fully homomorphic scheme, Evaluate(pk, C, $\psi_1, \ldots, \psi_t$) constructs a Yao garbling C† of C, uses the OT queries $\psi_1, \ldots, \psi_t$ to construct OT responses $\psi_1^*, \ldots, \psi_t^*$ designed to obliviously transfer Yao keys associated to the t input wires in C†, and outputs (C†, $\psi_1^*, \ldots, \psi_t^*$). To decrypt this ciphertext, the key holder "decrypts" the OT responses $\psi_1^*, \ldots \psi^{t*}$ to recover Yao keys for the input wires, and then evaluates the garbled circuit. It has also been shown how to achieve statistical circuit privacy, but only for limited classes of circuits, namely, NC1 and NLOGSPACE.

A more interesting technique to exclude the trivial solution is to require (roughly) that the ciphertext encrypting $C(\pi_1, \ldots, \pi_t)$ should "look like" an "ordinary" ciphertext, as long as $C(\pi_1, \ldots, \pi_t)$ is a single bit (or element of the same plaintext space that contains $\{\pi_i\}$). For example, the size of the ciphertext output by Evaluate(pk, C, $\psi_1, \ldots, \psi_t$) should not depend on C. Focus is placed on this definition. Actually, a stronger requirement is assumed: that Decrypt$_\epsilon$ be expressible by a circuit D$_\epsilon$, which takes a (formatted) secret key and (formatted) ciphertext as input, and whose size is (a fixed) polynomial in the security parameter. This implies that there is an upper bound on the ciphertext size that depends only on the security parameter, and is independent of C.

It may be useful to provide a physical analogy as an aid in visualizing the concept of fully homomorphic encryption. Assume that the owner of a jewelry store wants her employees to assemble raw precious materials (diamonds, gold, etc.) into finished products, but is worried about theft. The owner addresses the problem by constructing glove boxes for which only the owner has the key, and puts the raw materials inside the glove boxes. Using the gloves, an employee can manipulate the items inside the box. Moreover, an employee can put things inside the box, e.g., a soldering iron to use on the raw materials, although the employee cannot take anything out.

Also, the box is transparent, so that an employee can see what he is doing within the box. In this analogy, encryption means that the employee is unable to take something out of the box, not that he is unable to see it. After the employee is finished, the jewelry store owner can recover the finished product at her leisure by using her key. This analogy is inadequate in the sense that the glove box might become quite cluttered, whereas in the fully homomorphic encryption scheme only the final product need remain. In other words, to improve the analogy, imagine that the employee has some way to make any item in the glove box (of his choosing) disappear, even though he still cannot extract the item.

In view of the foregoing analogy, and now with respect to fully homomorphic encryption, assume that, a priori, there is a scheme $\epsilon$ that is only guaranteed to be correct for some subset $C_\epsilon$ of circuits, i.e., $$\text{Decrypt}_\epsilon(sk, \text{Evaluate}_\epsilon(pk, C, \psi_1, \ldots, \psi_t)) = C(\pi_1, \ldots, \pi_t),$$

is guaranteed to hold only if $C \in C_\epsilon$ (and, as before, $\psi_i \leftarrow \text{Encrypt}_\epsilon(pk, \pi_i)$). Can one then use $\epsilon$ to construct a scheme $\epsilon^*$ that is fully homomorphic?

Figure 2A:
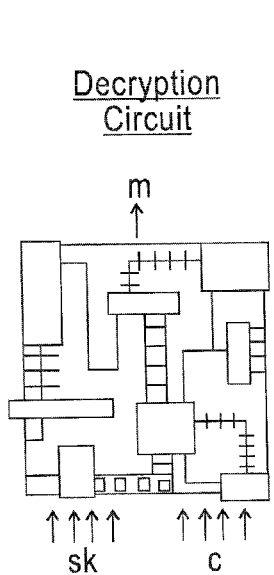
FIGS. 2A and 2B, collectively referred to as FIG. 2, show an exemplary decryption circuit and the exemplary decryption circuit augmented by a NAND logic function, respectively.
Figure 2B:
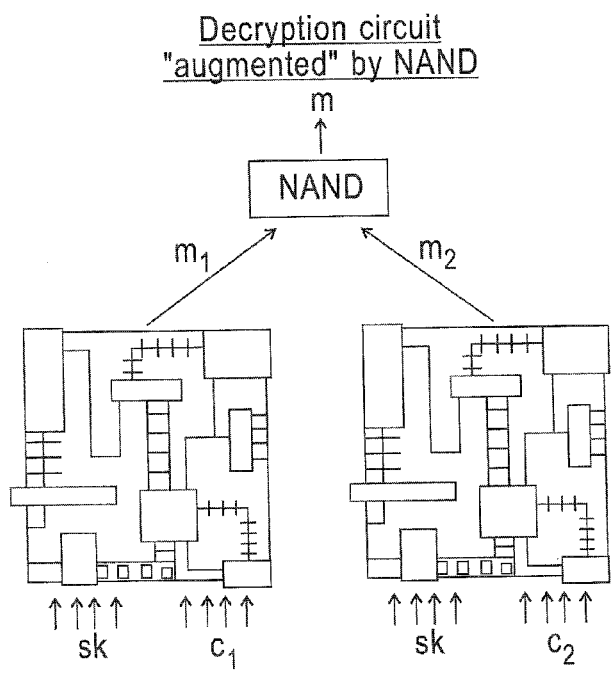

It is shown below that that the answer to this question is yes. Suppose that $C_\epsilon$ contains just two circuits: $D_\epsilon$ and the augmentation of $D_\epsilon$ by NAND (i.e., a NAND gate connecting two copies of $D_\epsilon$), where $D_\epsilon$ is the circuit associated to the decryption algorithm. Reference in this regard can be made to FIG. 2. A NAND is used for convenience in that any circuit can be expressed in terms of NAND gates. However, the decryption circuit could be augmented by a different set of universal gates. If $\epsilon$ has this self-referential property of being able to evaluate its own (augmented) decryption circuit, it can be said that S is bootstrappable. It is shown that the bootstrappable encryption implies leveled fully homomorphic encryption, i.e., that $D_\epsilon$ plus the NAND-augmentation of $D_\epsilon$ constitute a "complete" set of circuits:

Theorem 1 (Informal) If $\epsilon$ is bootstrappable, then, for any integer d, one can construct a scheme $\epsilon^{(d)}$ that can evaluate any circuit (consisting of NAND gates) of depth d. The decryption circuit for $\epsilon^{(d)}$ is the same as for $\epsilon$, and the complexity of encryption is also the same. $\epsilon^{(d)}$'s public key size is O(d) times that of $\epsilon$'s. The complexity of $\text{Evaluate}_{\epsilon^{(d)}}$ is polynomial in the security parameter and linear in the circuit size. If $\epsilon$ is semantically secure against chosen plaintext attacks, then so is $\text{Evaluate}_{\epsilon^{(d)}}$ Note with regard to $\epsilon^{(d)}$ that its public key is O(d) times that of $\epsilon$'s public key. Since $\epsilon^{(d)}$ has this dependence on d, one can say that it is merely leveled fully homomorphic. Under certain assumptions, one can make the $\epsilon^{(d)}$ public key size be independent of d, in which case it can be said that the derived scheme is fully homomorphic.

It can be noted that, significantly, $\epsilon$ can evaluate (augmentations of) $D_\epsilon$. Assume that the distributions of $\text{Evaluate}_\epsilon(pk, C, \psi_1, \ldots, \psi_t)A$ and $\text{Encrypt}_\epsilon(pk, C(\pi_1, \ldots, \pi_t))Q$ are different. In particular, assume that there is an "error" associated with each ciphertext, that ciphertexts output by $\text{Encrypt}_\epsilon$ have small error, that ciphertexts output by $\text{Evaluate}_\epsilon$ have larger error that increases with the depth of the circuit being evaluated, and that eventually (as the depth of the circuit being evaluated increases) the "error" becomes so large that applying $\text{Decrypt}_\epsilon$ to the ciphertext results in a decryption error. Intuitively, as one evaluates a circuit and the implicit "error" becomes large, it would be desirable to "refresh" the ciphertext so that the error becomes small again. One could refresh a ciphertext by completely decrypting it, simply by generating an entirely new and fresh ciphertext that encrypts the same thing. However, this would require knowledge of the secret key, which is not desirable. Instead, in bootstrapping it becomes possible to decrypt the ciphertext, but homomorphically.

Specifically, assume that $\epsilon$ is bootstrappable, with plaintext space P={0,1}, and that the circuits are Boolean. Assume further that there is exists a ciphertext $\psi_1$ that encrypts $\pi$ under $pk_1$, which is desired to be refreshed. So that it can be decrypted homomorphically, also assume the presence of $sk_1$, the secret key for $pk_1$, encrypted under a second public key $pk_2$: let $\overline{sk_{1j}}$ be the encryption of the jth bit of $sk_1$. Consider the following algorithm.

$\text{Recrypt}_\epsilon(pk_2, D_\epsilon, \langle \overline{sk_{1j}} \rangle, \psi_1).$ Set $\overline{\psi_{1j}} \xleftarrow{R} \text{Encrypt}_\epsilon(pk_2, \psi_{1j})$ Output $\psi_2 \leftarrow \text{Evaluate}_\eta(pk_2, D_\epsilon, \langle \langle \overline{sk_{1j}} \rangle, \langle \overline{\psi_{1j}} \rangle \rangle)$ Above, Evaluate takes in the bits of $sk_1$ and $\psi_1$, each encrypted under $pk_2$. Then, $\epsilon$ is used to evaluate the decryption circuit homomorphically. The output $\psi_2$ is thus an encryption under $pk_2$ of $\text{Decrypt}_\epsilon(sk_1, \psi_1) = \pi$. In other words, Recrypt decrypts homomorphically using the encrypted secret key, thus obtaining a new ciphertext that encrypts the same thing as the original one.

It can be noted how $\pi$ is doubly encrypted at one point, and that $\text{Evaluate}_\epsilon$ is used to remove the inner encryption. Applying the decryption circuit $D_\epsilon$ removes the "error" associated to the first ciphertext under $pk_1$, but $\text{Evaluate}_\epsilon$ simultaneously introduces a new "error" while evaluating the ciphertexts under $pk_2$. Intuitively, progress has been made so long as the second error is less (shorter). It is important to note that revealing the encrypted secret key bits $\langle \overline{(sk_{1j})} \rangle$ does not compromise semantic security; as these encrypted secret key bits are indistinguishable from encryptions of 0 as long as $\epsilon$ is semantically secure by a standard hybrid argument. This hybrid argument breaks down if $pk_1 = pk_2$. However, if $\epsilon$ securely encrypts key-dependent messages (is KDM-secure), i.e., roughly, if providing a ciphertext that encrypts a function of the secret key does not hurt security, then Recrypt can have a "self-loop" of encrypted secret keys.

Reference with regard to the concept of KDM-secure may be made to, for example: J. Black, P. Rogaway, and T. Shrimpton. Encryption-scheme security in the presence of key-dependent messages. In Proc. of SAC '02, LNCS 2595, pages 62-75. Springer, 2002; S. Halevi and H. Krawczyk. Security under key-dependent inputs. In Proc. of ACM CCS '07, 2007; and D. Boneh, S. Halevi, M. Hamburg, and R. Ostrovsky. Circular-Secure Encryption from Decision Diffe-Hellman. In Proc. of Crypto '08, LNCS 5157, pages 108-125.

However, the goal is to perform nontrivial homomorphic operations on underlying plaintexts, not merely to obtain refreshed encryptions of the same plaintext. If one can also evaluate a NAND augmentation of the decryption circuit, then one can generate an encryption of ($\pi_1$ NAND $\pi_2$) under $pk_2$ using the encrypted secret key ($sk_1$ under $pk_2$) together with the two ciphertexts encrypting $\pi_1$ and $\pi_2$, respectively, under $pk_1$. By recursively performing this type of operation on all ciphertexts at a given level in the circuit, it becomes possible to evaluate a d-depth circuit of NANDs. If $\epsilon$ is KDM-secure, the operation is fully homomorphic (rather than leveled fully homomorphic). In a random oracle model, discussed below, it is shown that a bootstrappable encryption scheme implies a scheme that is both bootstrappable and KDM-secure, and thus implies a fully homomorphic encryption scheme.

Again, it may be helpful to view bootstrapping in terms of the jewelry store physical analogy. Imagine that the glove boxes are defective; after an employee uses the gloves for one minute, the gloves stiffen and become unusable. Unfortunately, even the fastest employee cannot assemble some of the more intricate designs in under a minute. To solve this problem the jewelry store owner gives to an employee that is assembling an intricate design a glove box containing the raw materials, but also several additional glove boxes. Each of these additional glove boxes holds a copy of the master key. To assemble the intricate design, the employee manipulates the materials in box #1 until the gloves stiffen. Then, he places box #1 inside box #2, where the latter box already contains a master key. Using the gloves for box #2, he opens box #1 with the master key, extracts the partially assembled item, and continues the assembly within box #2 until its gloves stiffen. He then places box #2 inside box #3, and so on. The employee finally finishes his assembly inside of box #n. Of course, this procedure assumes that the employee can open box #i within box #(i+1), and have time to some progress on the assembly, all before the gloves of box #(i+1) stiffen. This is analogous to the requirement for a bootstrappable encryption scheme $\epsilon$, that the complexity of $\epsilon$'s (augmented) decryption circuit is less than what $\epsilon$ can homomorphically evaluate.

The foregoing analogy assumes that it is safe to use a single master key that opens all boxes. However, perhaps an employee could use the gloves for box #2, together with master key inside that box, to open the box from the inside, extract the key, and use it to open box #1 and remove the jewels. However, this situation can be avoided by using distinct keys for the boxes, and placing the key for box #1 inside box #2, the key for box #2 inside box #3, and so on. This is analogous to the question of whether the encryption scheme is KDM-secure.

One non-limiting application of fully homomorphic encryption is in a two-party setting. A simple example is making encrypted queries to search engines. Referring to FIG. 1, to perform an encrypted search a party (requestor 1) generates a public key pk for the fully homomorphic encryption scheme, and generates ciphertexts $\psi_1, \ldots, \psi_t$ that encrypt the query $\pi_1, \ldots, \pi_t$ under pk. (For example, each $\pi_i$ could be a single bit of the query.) Now, let the circuit C express a search engine server 2 search function for data stored in storage 3. The server 2 sets $\psi_i^* \leftarrow \text{Evaluate}(pk, C_i, \psi_1, \ldots, \psi_t)$, where $C_i$ is the sub-circuit of C that computes the ith bit of the output. Note that, in practice, the evaluation of $C_i^*$ and $C_j^*$ may share intermediate results, in which case it may be needlessly inefficient to run independent instances of the Evaluate algorithm. The server 2 sends these ciphertexts to the requestor 1. It is known that, by the correctness requirement, $\text{Decrypt}(sk, \psi_i^*) = C_i(\pi_1, \ldots, \pi_t)$. These latter values constitute precisely the answer to the query, which is recoverable through decryption.

As another non-limiting application, the exemplary embodiments of this invention enable searching over encrypted data. In this scenario, assume that the requestor 1 stores files on the server 2 (e.g., on the Internet), so that the requestor 1 can conveniently access these files without needing the requestor's computer. However, the requestor encrypts the files, otherwise the server 2 could potentially read the private data. Let bits $\pi_1, \ldots, \pi_t$ represent the files, which are encrypted in the ciphertexts $\psi_1, \ldots, \psi_t$. Assume then that the requestor 1 later wants to download all encrypted files that satisfy a query, e.g., all files containing the word 'homomorphic' within 5 words of 'encryption', but not the word 'evoting'. The requestor 1 sends the query to the server 2, which expresses it as a circuit C. The server sets $\psi_i^* \leftarrow \text{Evaluate}(pk, C_i, \psi_1, \ldots, \psi_t)$ and sends these ciphertexts to the requestor 1. who decrypts the returned ciphertexts to recover $C(\pi_1, \ldots, \pi_t)$, the (bits of the) files that satisfy the query.

Note that in this application, as in the encrypted search application, the requestor preferably provides an upper bound on the number of bits that the response should have, and the encrypted response from the server 2 is padded or truncated to meet the upper bound.

Assume now that a party A wants the value of $f(\pi_1, \ldots, \pi_t)$, where $f$ is some function "owned" by a party B, but party A does not want to reveal $\pi_1, \ldots, \pi_t$. (Possibly, party B also does not want to reveal $f$.) In the above mentioned technique of Yao party B would express the function as a Boolean circuit C, generate (for each wire in the circuit) two random strings that are associated respectively to '0' and '1' at that wire, and construct ciphertexts that encrypt the gates of the circuit in a certain way using a symmetric encryption scheme. Party B then sends the "garbled circuit," which consists of the ciphertexts, along with the strings for '0' and associated to the output wire of C, to party A. To obtain $f(\pi_1, \ldots, \pi_t)$, party A would use oblivious transfer to obtain the strings associated to the bits $\pi_1, \ldots, \pi_t$ for the input wires of the garbled circuit, and then evaluate the garbled circuit to obtain the string for either '0' or '1' associated to the output wire of C.

Comparing now the fully homomorphic encryption technique in accordance with the exemplary embodiments of this invention to a previous general solution for secure two-party computation, namely, "Yao's garbled circuit", one problem with Yao's protocol is that the communication complexity is proportional to the size of the circuit C. This makes the protocol rather unattractive in both of the scenarios discussed above (encrypted search and searching encrypted data). In the encrypted search scenario, the search engine 2 would need to send the requestor 1 a large garbled circuit whose size is proportional to the data being searched. In the scenario of searching on encrypted data, the requestor 1 would need to send a circuit whose size is proportional to the size of the data. If such communication complexity could be tolerated, then the server 2 may simply just send all of the requestor's encrypted without "processing" those files at all, and let the requestor 1 determine which files are needed. With fully homomorphic encryption, however, the communication complexity is significantly reduced. In particular, the communication needed, other than pk, is simply the number of bits needed to express the (cleartext) query and the (cleartext) response of the server 2, each multiplied by the size of the security parameter, since each cleartext bit becomes a ciphertext. Actually, for the inputs to the circuit, e.g., the search query, the scheme's communication overhead here can be only additive, rather than multiplicative. Note that while Yao's protocol enables hiding the circuit, the fully homomorphic encryption scheme can be augmented to provide unconditional circuit privacy.

In view of the computational overhead of the fully homomorphic encryption technique in accordance with this invention asynchronous application scenarios may be more desirable in practice. One example is the spam filtering of encrypted emails: given an email encrypted using the fully homomorphic encryption technique under the public key of a certain party, that party's e-mail server can homomorphically apply its spam filter to the email to obtain an encryption of '0' (indicating the email is not spam) or '1' (indicating that it is).

Later the party can decrypt this single ciphertext to recover a bit b, and then only decrypt the remainder of the email if b=0.

Regarding multiparty computation, it has been shown that the fully homomorphic encryption technique can securely compute any function. More specifically, one can construct efficient secure protocols for any multiparty computation in which there is an honest majority (see O. Goldreich, S. Micali, and A. Wigderson. How to play any mental game—a completeness theorem for protocols with honest majority. J. of the ACM, vol. 38, no. 1, pp. 691-729, 1991, Preliminary version in FOCS '86), assuming only the existence of trapdoor permutations. By "efficient" it is not implied that these protocols are necessarily practical. What is meant instead is that the communication and computational complexity of the secure protocol equals the computational complexity of the insecure protocol times some factor that is polynomial in the security parameter and number of parties.

It is known that it is possible to construct a secure protocol whose communication complexity is polynomial in the security parameter and the communication complexity of the insecure protocol. However, at least one conventional approach exhibits a computational complexity that is exponential (in the worst case) in the communication complexity. In eliminating one type of unwanted dependence, it introduces another. The question thus remains as to whether a protocol can be made secure while leaving both the communication and the computational complexity unchanged, up to a factor polynomial in the security parameter? With fully homomorphic encryption, the answer is essentially yes. More precisely, the answer is affirmative if one relaxes the definition of communication complexity to include the bit-lengths of the output functions (which normally would not necessarily be included, since they are not communicated).

In greater detail, assume first a simple case of two-party secure function evaluation, where only one party receives an output. In a "semi-honest setting", a first party generates a public key for the fully homomorphic encryption scheme and provides the public key, along with encrypted inputs, to a second party. The second party encrypts his inputs, homomorphically evaluates the function on his and the first party's input, randomizes the output ciphertexts if necessary (to achieve circuit privacy, so that the output ciphertexts are statistically independent of the second party's inputs, except insofar as the output plaintexts are dependent on the second party's inputs), and sends the output ciphertexts to the first party. The privacy of the first party's inputs follows from the semantic security of the encryption scheme, while the privacy of the second party is unconditional. The total communication in this protocol is exactly that of the insecure protocol, times a factor polynomial in the security parameter (similarly for the computational complexity); this is a significant qualitative improvement over Yao's garbled circuit, where the communication is proportional to the computational complexity of the function. Actually, it is possible to increase the communication overhead by only an additive factor polynomial in the security parameter, except that the communication overhead is multiplicative with respect to the output function's bit-length.

Extending the application of fully homomorphic encryption from the two-party setting to the multiparty setting is not entirely trivial since, in the two-party setting, the second party prevents the first party from seeing any intermediate values encrypted under the first party's key simply by completing the computation and sending back the final encrypted value to the first party. However, in the multiparty setting, it is less clear how one prevents the first party from seeing intermediate value encrypted under the key of the first party.

An approach can be used that was initially proposed by M. Franklin and S. Haber. Joint encryption and message-efficient secure computation, Journal of Cryptology, 9(4):217-232, 1996), and further developed in R. Cramer, I. Damgaard, and J. B. Nielsen. Multiparty computation from threshold homomorphic encryption, In Proc. of Crypto '01, LNCS 2045, pages 280-300. Namely, basing secure multiparty computation on threshold homomorphic encryption. The underlying concept is simple: the parties must use some (other) scheme for secure computation to set up a public key for the fully homomorphic encryption scheme and distribute shares of the secret key; this introduces additive communication and computational overhead that is independent of the insecure protocol. After setup, the parties perform exactly the communications and computations that they would in the insecure protocol, except on encrypted data; fully homomorphic encryption ensures that, if a party was able to perform computations locally in the insecure protocol, it is also able to in the secure protocol. Afterwards, they use some scheme for secure computation to perform threshold decryption on the encrypted outputs; again, this overhead is independent of the insecure protocol, except insofar as it depends on the bit-lengths of the function outputs. This scheme is dependent on the number of multiplication gates in the circuit, because these could not be performed homomorphically. With a fully homomorphic encryption scheme this problem is avoided, and the high-level concept of an "arithmetic black box" can be fully realized.

To handle malicious parties one can use a transformation (e.g., see M. Naor and K. Nissim. Communication preserving protocols for secure function evaluation, In Proc. of STOC '01, pages 590-599, 2001) from a protocol for multiparty SFE with semi-honest parties to a protocol for malicious ones via a compiler that is communication-preserving, i.e., the transformation adds communication polynomial in the security parameter and polylogarithmic in the inputs.

The literature mentions numerous other applications where fully homomorphic encryption would be useful. For example, O. Goldreich and R. Ostrovsky. Software protection and simulation by oblivious RAMs, JACM, 1996 consider software protection and show that any program can be converted to a pair consisting of an encrypted program and a CPU with $\lambda$ bits of "shielded" memory, where $\lambda$ is the security parameter, which defeats "experiments" by an adversary that might either attempt the determine the values that are stored and retrieved from memory, or try to determine the program's "access pattern", i.e., its attempts to change the values. In this scheme there is a logarithmic increase in the computation time; however, the shielded CPU needs to be accessed for any nontrivial computation. With a fully homomorphic encryption scheme, the program and values can remain encrypted throughout the computation until the end. The shielded CPU only needs to be accessed to perform the decryption of the final output.

In S. Goldwasser, Y. T. Kalai, and G. Rothblum. One-Time Programs. In Proc. of Crypto '08, LNCS 5157, pages 39-56. Springer, 2008 there is introduced the concept of one-time programs, in which minimal use of hardware is made to ensure that a program is used only once. This approach essentially encrypts the program using Yao's garbled circuit, and uses a secure device to perform the decryption (a toggle bit is used to ensure that this decryption occurs only once). One shortcoming of this approach is that the size of the encrypted program is proportional to the maximal running time of the program. With a fully homomorphic encryption scheme, however, one can construct an (encrypted) one-time program whose size is proportional to the original program. Essentially, one simply encrypts the program using the fully homomorphic encryption scheme, and runs it homomorphically, using the device to perform the final decryption.

As a further application of interest, R. Ostrovsky and W. E. Skeith. Private Searching on Streaming Data. In Proc. of Crypto '05, LNCS 3621, pp. 223-240) propose the notion of public-key obfuscation, i.e., where a sort of obfuscation is achieved simply by encrypting the program; somehow, one then runs the encrypted program, and afterwards decrypts the output. With a fully homomorphic encryption scheme, running the encrypted program is straightforward. This may be of particular interest for applications such as web services and cloud computing, where the use of fully homomorphic encryption would permit remote computations on encrypted data with complete privacy.

In a proxy re-encryption (e.g., see M. Blaze, G. Bleurner, and M. Strauss. Divertible protocols and atomic proxy cryptography. Eurocrypt '98, LNCS 1403, pp. 127-144) the idea is that the first party publishes a tag $\tau$ that will permit anyone to convert a ciphertext encrypted under the public key $pk_A$ of the first party into an encryption of the same message under the public key $pk_B$ of a second party. However, previous proxy re-encryption schemes have shortcomings, e.g., they either are not unidirectional (i.e., the tag of the first party can also be used to convert ciphertexts under $pk_B$ to ciphertexts under $pk_A$, and both parties must cooperate to produce $\tau$), or they are not multi-use (i.e., it is impossible to construct a sequence of tags $\tau_1, \tau_2, \ldots$ that allows anyone to convert ciphertexts under $pk_A$ to $pk_B$, $pk_B$ to $pk_C$, and so on indefinitely, without the ciphertexts growing in size). Recursive application of the Recrypt algorithm in accordance with an aspect of this invention provided the first unidirectional multi-use proxy re-encryption scheme.

With fully homomorphic encryption, one can construct non-interactive zero knowledge proofs (NIZKs) of small size. For example, assume that the first party wishes to prove that $\pi_1, \ldots, \pi_t$ is a satisfying assignment of a Boolean circuit C. The first party generates a public key pk for the fully homomorphic encryption scheme, the input ciphertext:

$$\{\psi_i \leftarrow \text{Encrypt}(pk, \pi_i)\},$$

and the output ciphertext:

$$\psi^* \leftarrow \text{Evaluate}(pk, C, \psi_1, \ldots, \psi_t).$$

The NIZK that the assignment is satisfying is composed of NIZK proofs, under any NIZK scheme, that pk, $\{\psi_i\}$ and $\psi^*$ are well-formed, where well-formedness for the ciphertexts means that each $\psi_i$ is a valid encryption of '0' or '1', and $\psi^*$ is a valid encryption of '1'. A verifier checks the NIZKs for well-formedness, and confirms that $\psi^* = \text{Evaluate}(pk, C, \psi_1, \ldots, \psi_t)$. Intuitively, the NIZK proof works because, if the verifier believes that pk and the input ciphertexts are well-formed, then the correctness of the encryption scheme implies that the output ciphertext can encrypt '1' only if $C(\pi_1, \ldots, \pi_t) = 1$. The size of the NIZK proof is proportional to the number of inputs to the circuit, but is otherwise independent of the size of the circuit.

Described now in even further detail is the leveled fully homomorphic encryption from bootstrappable encryption, in accordance with the exemplary embodiments of this invention.

To explain this procedure mathematically, begin by considering the following algorithm, which may be referred to as Recrypt For simplicity, assume the plaintext space P is $\{0,1\}$ and $D_\epsilon$ is a Boolean circuit in $C_\epsilon$. Let $(sk_1, pk_1)$ and $(sk_2, pk_2)$ be two $\epsilon$ key-pairs. Let $\psi_1$ be an encryption of $\pi \in P$ under $pk_1$. Let $\overline{sk_{1j}}$ be an encryption of the j-th bit of the first secret key $sk_1$ under the second public key $pk_2$. Recrypt takes these as inputs, and outputs an encryption of $\pi$ under $pk_2$.

$$\text{Recrypt}(pk_2, D_\epsilon, \langle \overline{sk_{1j}} \rangle, \psi_1).$$

$$\text{Set} \overline{\psi_{1j}} \xleftarrow{R} \text{Encrypt}_\epsilon(pk_2, \psi_{1j}) \text{ where } \psi_{1j} \text{ is the } j\text{-th bit of } \psi_1$$

$$\text{Set} \psi_2 \leftarrow \text{Evaluate}_\epsilon(pk_2, D_\epsilon, \langle \langle \overline{sk_{1j}} \rangle, \langle \overline{\psi_{1j}} \rangle \rangle) \text{Output} \psi_2$$

Above, the Evaluate algorithm takes in all of the bits of $sk_1$ and all of the bits of $\psi_1$, each encrypted under $pk_2$. Then, $\epsilon$ is used to evaluate the decryption circuit homomorphically. The output $\psi_2$ is thus an encryption under $pk_2$ of $\text{Decrypt}_\epsilon(sk_1, \psi_1) \to \pi$.

It can be noted that the Recrypt algorithm implies a proxy one-way re-encryption scheme, where a one-way proxy re-encryption scheme allows the owner of $sk_1$ to generate a tag that enables an untrusted proxy to convert an encryption of $\pi$ under $pk_1$ to an encryption of $\pi$ under $pk_2$, but not the reverse. In the description above, the tag is $\langle \overline{sk_1} \rangle$, the encrypted secret key. Strictly speaking, the security model for proxy re-encryption typically requires the security of the delegator's secret key, even against a collusion of delegatee's who also are enabled to see the delegating tags. However, this requirement seems unnecessary, since a delegatee will in any case be able to decrypt ciphertexts directed to the delegator.

In the Recrypt algorithm above, the plaintext $\pi$ is doubly encrypted at one point, under both $pk_1$ and $pk_2$. Depending on the encryption scheme $\epsilon$, however, this double encryption may be excessive. For example, assume that $\text{WeakEncrypt}_\epsilon$ is an algorithm such that the image of $\text{WeakEncrypt}_\epsilon(pk, \pi)$ is always a subset of the image of $\text{Encrypt}_\epsilon(pk, \pi)$. Then we can replace the first step of $\text{Recrypt}_\epsilon$ with:

$$\text{Set } \overline{\psi_{1j}} \xleftarrow{R} \text{WeakEncrypt}_\epsilon(pk_2, \psi_{1j}) \text{ where } \psi_{1j} \text{ is the } j\text{-th bit of } \psi_1$$

This relaxation may be referred to as $\text{Recrypt}_\epsilon'$. An element of this relaxation is that WeakEncrypt does not need to be semantically secure for $\text{Recrypt}_\epsilon'$ to be a secure one-way proxy re-encryption scheme, or for $\text{Recrypt}_\epsilon'$ to be useful toward bootstrapping (as is shown below). Thus, depending on $\epsilon$, $\text{WeakEncrypt}_\epsilon$ can be very simple, e.g., for some schemes $\text{WeakEncrypt}_\epsilon$ may leave the input "bits" entirely unmodified. This will affect the eventual computational complexity of the algorithm, since it will require less computation to apply the decryption circuit homomorphically to ciphertexts in which the outer encryption is weak. Another way of viewing this relaxation is that one only needs to be able to evaluate non-uniform decryption circuits, where the ciphertext is "hard-wired" into the circuit (making this circuit simpler than the "normal" decryption circuit that takes the ciphertext (and secret key) as input.

To be bootstrappable, $\epsilon$ needs to be able to compactly evaluate not only its decryption circuit, which allows recryptions of the same plaintext, but also slightly augmented versions of it, so that it becomes possible to perform binary operations on plaintexts and thus make actual progress through a circuit.

An "Augmented Decryption Circuit" may be defined as follows: let $D_\epsilon$ be $\epsilon$'s decryption circuit, which takes a secret key and ciphertext as input, each formatted as an element of $P^{l(\lambda)}$, where P is the plaintext space. Let $\Gamma$ be a set of gates with inputs and output in P, which includes the trivial gate (input and output are the same). One may then call a circuit composed of multiple copies of $D_\epsilon$ connected by a single g gate (the number of copies equals the number of inputs tog) a "g-augmented decryption circuit", where one may denote the set of g-augmented decryption circuits, $g \in \Gamma$, by $D_\epsilon(\Gamma)$.

Defined now is a "Bootstrappable Encryption Scheme". As before, let $C_\epsilon$ denote the set of circuits that $\epsilon$ can compactly evaluate. It can be said that $\epsilon$ is bootstrappable with respect to $\Gamma$ if $$D_\epsilon(\Gamma) \subseteq C_\epsilon.$$

For example, if $\Gamma$ includes the trivial gate and a NAND, $\epsilon$ is bootstrappable with respect to $\Gamma$ if $C_\epsilon$ contains $D_\epsilon$ and the circuit formed by joining two copies of $D_\epsilon$ with a NAND gate. Significantly, and as will be shown below, if there is a scheme $\epsilon$ that can compactly evaluate only these two circuits, then there is a scheme that is leveled fully homomorphic.

It should be noted that one can relax the bootstrappability definition slightly to say that $\epsilon$ only needs to be able to homomorphically evaluate its (augmented) decryption circuit when the input ciphertext is weakly encrypted, similar to the relaxation Recrypt$_\epsilon$' above. However, this approach could make the definition of being bootstrappable more cumbersome and, as a result, the following description will use the definition given above. However, it should be kept in mind that the foregoing relaxation can be used.

From the informal description above, it should be apparent to those skilled in the art how to use a bootstrappable encryption scheme to construct a leveled fully homomorphic one. A more formal description is given below.

Let $\epsilon$ be bootstrappable with respect to a set of gates $\Gamma$. For any integer $d \geq 1$, use $\epsilon$ to construct a scheme $\epsilon^{(d)} = (\text{KeyGen}_{\epsilon^{(d)}}, \text{Encrypt}_{\epsilon^{(d)}}, \text{Evaluate}_{\epsilon^{(d)}}, \text{Decrypt}_{\epsilon^{(d)}})$ that can handle all circuits of depth d with gates in $\Gamma$. Note that in the description below the secret keys are encrypted in reverse order. However, this is not a limitation on the use of this invention, but is used to simplify the description of the recursion in Evaluate. When a reference is made to the level of a wire in C, what is implied is the level of the gate for which the wire is an input. The notation $D_\epsilon(\Gamma, \delta)$ is used to refer to the set of circuits that equal a $\delta$-depth circuit with gates in $\Gamma$ augmented by $D_\epsilon$ (copies of $D_\epsilon$ become inputs to the $\delta$-depth circuit).

KeyGen$_{\epsilon^{(d)}}(\lambda, d)$. This function takes as input a security parameter $\lambda$ and a positive integer d. For $l = l(\lambda)$, as in the definition above, it sets $$(sk_i, pk_i) \xleftarrow{R} KeyGen_\epsilon(\lambda) \text{ for } i \in [0, d]$$

$$\overline{sk_{ij}} \xleftarrow{R} Encrypt_\epsilon(pk_{i+1}, sk_{ij}) \text{ for } i \in [0, d-1], j \in [1, l]$$

where $sk_{i1}, \ldots, sk_{il}$ is the representation of $sk_i$ as elements of P. It outputs the secret key $sk^{(d)} \leftarrow sk_d$ and the public key $pk^{(d)} \leftarrow (\langle pk_i \rangle, \langle \overline{sk_{ij}} \rangle)$. Let $\epsilon^{(\delta)}$ refer to a sub-system that uses $sk^{(\delta)} \leftarrow sk_d$ and $pk^{(\delta)} \leftarrow (\langle pk_i \rangle_{i \in [d-\delta, d]}, \langle \overline{sk_{ij}} \rangle_{i \in [d-\delta, d-1]})$ for $\delta \leq d$.

$$Encrypt_{\epsilon^{(d)}}(pk^{(d)}, \pi).$$

This function takes as input a public key $pk^{(d)}$ and a plaintext $\pi \in P$. It outputs a ciphertext $$\psi \xleftarrow{R} Encrypt_\epsilon(pk_0, \pi).$$

$$Decrypt_{\epsilon^{(d)}}(sk^{(d)}, \psi).$$

This function takes as input a secret key $sk^{(d)}$ and a ciphertext $\psi$ (which should be an encryption under $pk_d$). It outputs Decrypt$_\epsilon$(sk d,$\psi$).

$$Evaluate_{\epsilon^{(\delta)}}(pk^{(\delta)}, C_\delta, \Psi_\delta).$$

This function takes as input a public key $pk^{(\delta)}$, a circuit $C_\delta$ of depth at most $\delta$ with gates in $\Gamma$, and a tuple of input ciphertexts $\Psi_\delta$ (where each input ciphertext should be under $pk_\delta$). It is assumed that each wire in $C_\delta$ connects gates at consecutive levels; if not, trivial gates may be added to make it so. If $\delta = 0$, this function outputs $\Psi_0$ and terminates. Otherwise, this function does the following:

Sets $(C_{\delta-1}^\dagger, \Psi_{\delta-1}^\dagger) \leftarrow Augment_{\epsilon^{(\delta)}}(pk^{(\delta)}, C_\delta, \Psi_\delta)$.

Sets $(C_{\delta-1}, \Psi_{\delta-1}) \leftarrow Reduce_{\epsilon^{(\delta-1)}}(pk^{(\delta-1)}, C_{\delta-1}^\dagger, \Psi_{\delta-1}^\dagger)$ Runs $Evaluate_{\epsilon^{(\delta-1)}}(pk^{(\delta-1)}, C_{\delta-1}, \Psi_{\delta-1})$.

$Augment_{\epsilon^{(\delta)}}(pk^{(\delta)}, C_\delta, \Psi_\delta)$.

This function takes as input a public key $pk^{(\delta)}$, a circuit $C_\delta$ of depth at most with gates in $\Gamma$, and a tuple of input ciphertexts $\Psi_\delta$ (where each input ciphertext should be under $pk_\delta$). This function augments $C_\delta$ with $D_\epsilon$ (call the resulting circuit $C_{\delta-1}\dagger$). Let $\Psi_{\delta-1}\dagger$ be the tuple of ciphertexts formed by replacing each input ciphertext $\psi \in \Psi_\delta$ by the tuple $\langle \langle \overline{sk_{\delta j}} \rangle, \langle \overline{\psi_j} \rangle \rangle$, where $\overline{\psi_j} \leftarrow WeakEncrypt_{\epsilon^{(\delta-1)}}(pk^{(\delta-1)}, \psi_j)$ and the $\psi_j$'s form the properly-formatted representation of $\psi$ as elements of P. This function outputs $(C_{\delta-1}\dagger, \Psi_{\delta-1}\dagger)$.

$$Reduce_{\epsilon^{(\delta)}}(pk^{(\delta)}, C_\delta^\dagger, \Psi_\delta^\dagger).$$

This function takes as input a public key $pk^{(\delta)}$, a tuple of input ciphertexts $\Psi_\delta\dagger$ (where each input ciphertext should be in the image of Encrypt$_{\epsilon^{(\delta)}}$), and a circuit $C_\delta\dagger \in D_\epsilon(\Gamma, \delta+1)$. It sets $C_\delta$ to be the sub-circuit of $C_\delta\dagger$ consisting of the first $\delta$ levels. It sets $\Psi_\delta$ to be the induced input ciphertexts of $C_\delta$, where the ciphertext $\psi_\delta^{(w)}$ associated to wire w at level $\delta$ is set to Evaluate$_\epsilon$(pk$_\delta$, $C_\delta^{(w)}$, $\Psi_\delta^{(w)}$) where $C_\delta^{(w)}$ is the sub-circuit of $C_\delta\dagger$ with output wire w, and $\Psi_\delta^{(w)}$ are the input ciphertexts for $C_\delta^{(w)}$. This function outputs $(C_\delta, \Psi_\delta)$.

A high level review of the Evaluate algorithm is now provided. Assume the presence of a circuit $C_d$ of, say, d levels with gates in $\Gamma$. For each input wire w of $C_d$ there is an associated input ciphertext $\psi_w$ encrypted under $pk_d$. Also assume the presence of an encryption scheme $\epsilon$ that compactly evaluates circuits in $D_\epsilon(\Gamma)$.

Note that it is not assumed that $\epsilon$ can evaluate gates in $\Gamma$; instead it is only assumed it can evaluate gates in $\Gamma$ that are augmented by the decryption circuit. A first step then is to augment $C_d$ by placing copies of $D_\epsilon$ at the leaves of $C_d$ (as is done in Augment), thereby constructing $C_{d-1}\dagger$. A question then that may arise is what are the input ciphertexts for the new circuit $C_{d-1}\dagger$?

Reconsider the algorithm $\text{Recrypt}_\epsilon'$. In $\text{Recrypt}_\epsilon'$, one begins with a ciphertext $\psi_1$ encrypting $\pi$ under $pk_1$ for the single wire w, and an "empty" circuit $C_1$ (since $\text{Recrypt}_\epsilon'$ doesn't actually evaluate any gates, it just generates a new encryption of the same plaintext). The next step was to augment $C_1$ with the decryption circuit $D_\epsilon$ to obtain $C_2 \leftarrow D_\epsilon$. The input ciphertexts $\Psi_2$ to $C_2$ include the encrypted secret key bits, and the weakly encrypted bits of $\psi_1$. It was then explained that the ciphertext generated by $\psi_2 \leftarrow \text{Evaluate}_\epsilon (pk_2, C_2, \Psi_2)$, which is also associated to wire w, also encrypts $\pi$, but now under $pk_2$.

In the full scheme above, the ciphertexts that were associated to the decryption circuit that was attached to wire w are analogous to the ones used in $\text{Recrypt}_\epsilon'$: the encrypted secret key ($sk_d$ under $pk_{d-1}$), and the re-encryption ciphertexts of $\psi_w$ under $pk_{d-1}$. By the correctness of Recrypt, the ciphertext now associated to w (after performing $\text{Evaluate}_\epsilon$) should encrypt the same plaintext as $\psi_w$, but now under $pk_{d-1}$.

The Reduce step simply performs this Evaluate up to the wire w, and one level beyond. Since Evaluate can correctly continue one level beyond the wire w, because (by assumption) $\epsilon$ can evaluate not just the decryption circuit attached to w, but can evaluate a circuit containing one $\Gamma$-gate above w. Reduce outputs $C_{d-1}$ and ciphertexts associated to $C_{d-1}$'s input wires. It can be noted that progress has been made, since $C_{d-1}$ is one level shallower than $C_d$. This entire process is performed d−1 more times to obtain the final output ciphertexts.

Note that it was previously said that Evaluate takes as input ciphertexts that are "fresh" outputs of Encrypt. However, note that $\text{Evaluate}_{\epsilon^{(\delta)}}$ also operates correctly on ciphertexts output by Evaluate. For $\delta<d$ above, this is precisely what $\text{Evaluate}_{\epsilon^{(\delta)}}$ does.

Discussed now is the correctness, computational complexity and the security of the foregoing generic construction.

Several theorems regarding the generic construction are now presented. Regarding correctness, consider the following theorem:

Let $\epsilon$ be bootstrappable with respect to a set of gates $\Gamma$. Then $\epsilon^{(d)}$ compactly evaluates all circuits of depth d with gates in $\Gamma$, i.e., if $\Gamma$ is a universal set of gates, the family $\epsilon^{(d)}$ is leveled fully homomorphic.

The proof of the foregoing correctness theorem may be stated as follows. First, define a convenient notation: let $D(\delta, w, C, \Psi)$ denote the plaintext value for wire w in circuit C induced by the decryptions (under $sk_\delta$) of the ciphertexts $\Psi$ associated to C's input wires. If C is empty (has no gates), then the input wires are the same as the output wires, and $D(\delta, w, C, \Psi)$ just denotes the decryption of the single ciphertext $\psi \in \Psi$ associated to w. To prove correctness, it suffices to show that $$D(d, w_{out}, C_d, \Psi_d) = D(0, w_{out}, C_0, \Psi_0) \quad (1)$$

for every output wire $w_{out}$ of $C_0$ (at level 0). First, when $$(C_{\delta-1}^\dagger, \Psi_{\delta-1}^\dagger) \leftarrow \text{Augment}_{\epsilon^{(\delta)}}(pk^{(\delta)}, C_\delta, \Psi_\delta),$$

it can be said that $D(\delta, w, C_\delta, \Psi_\delta) = D(\delta-1, w, C_{\delta-1}\dagger, \Psi_{\delta-1}\dagger)$ for any wire w at level at most $\delta-1$. This follows from the correctness of Recrypt (generalized beyond a Boolean plaintext space and Boolean circuits), and the fact that circuits $C_\delta$ and $C_{\delta-1}\dagger$ are identical up to level $\delta-1$.

Next, when $$(C_\delta, \Psi_\delta) \leftarrow \text{Reduce}_{\epsilon^{(\delta)}}(pk^{(\delta)}, C_\delta^\dagger, \Psi_\delta^\dagger) \text{ then}$$

$$D(\delta, w, C_\delta^\dagger, \Psi_\delta^\dagger) = D(\delta, w, C_\delta, \Psi_\delta)$$

for any wire at level at most $\delta$. This follows from the correctness of $\text{Evaluate}_\epsilon$ over circuits in $D_\epsilon(\Gamma)$, and the fact that circuits $C_\delta\dagger$ and $C_\delta$ are identical up to level $\delta$.

From these two claims, Equation 1 follows.

Note that $\Gamma$ is arbitrary. For example, each gate in $\Gamma$ could be a circuit of (ANDs, ORs, NOTs) of depth m and fan-in 2; for this value of $\Gamma$, The correctness theorem above implies that the described embodiment correctly evaluates Boolean circuits up to depth d·m.

Another factor to now consider is that the computational complexity of $\text{Evaluate}_{\epsilon^{(d)}}$ is reasonable, e.g., that recursive applications of Augment do not increase the effective circuit size exponentially.

Regarding computation complexity, consider the following theorem: for a circuit C of depth at most d and size S (defined here as the number of wires), the computational complexity of applying $\text{Evaluate}_{\epsilon^{(d)}}$ to C is dominated by at most s·l·d applications of $\text{WeakEncrypt}_\epsilon$ and at most s·d applications of $\text{Evaluate}_\epsilon$ to circuits in $D_\epsilon(\Gamma)$ where l is as defined above.

Considering now a proof of the foregoing theorem, assume a pre-processing step to ensure that all wires in the circuit connect gates at consecutive levels. Clearly, this step increases the number of wires in the circuit by at most a multiplicative factor of d. It remains to prove that, for the pre-processed circuit, the computational complexity is dominated by at most s'·l applications of Encrypt and at most s' applications of $\text{Evaluate}_\epsilon$ to circuits in $D_\epsilon(\Gamma)$, where s' is the size of the pre-processed circuit.

The complexity of $$\text{Augment}_{\epsilon^{(\delta)}}(pk^{(\delta)}, C_\delta, \Psi_\delta)$$

is dominated by replacing each ciphertext $\psi \in \Psi_\delta$ by the ciphertexts $\langle\langle \overline{sk_{\delta j}}\rangle, \langle \overline{\psi_j}\rangle\rangle$; generating the $\langle \overline{\psi_j}\rangle$'s involves $|W_\delta|\cdot l$ applications of $\text{WeakEncrypt}_\epsilon$, where $W_\delta$ is the set of wires at level $\delta$. Summing over all $\delta$, there are at most s'·l applications of $\text{WeakEncrypt}_\epsilon$.

The complexity of $$\text{Reduce}_{\epsilon^{(\delta)}}(pk^{(\delta)}, C_\delta^\dagger, \Psi_\delta^\dagger)$$

is dominated by the evaluation of $C_\delta^{(w)}$ for each $w \in W_\delta$, which involves $|W_\delta|$ applications of $\text{Evaluate}_\epsilon$ to circuits in $D_\epsilon(\Gamma)$. Summing over all $\delta$, there are at most s' such applications. The theorem thus follows.

Finally, assuming the semantic security of $\epsilon$, the semantic security of $\epsilon^{(d)}$ is now proved In this theorem let A be an algorithm that $(t,\alpha)$-breaks the semantic security of $\epsilon^{(d)}$.

Then, there is an algorithm B that $(t',\alpha')$-breaks the semantic security of $\epsilon$ for $t' \approx t \cdot l$ and $\alpha' \geq \alpha/l(d+1)$, for l as defined above.

The proof of this theorem is as follows. Let $(\epsilon)^l$ be equivalent to $\epsilon$, but with plaintext space $P \leq l$, where $\text{Encrypt}_{(\epsilon)l}$ involves up to l invocations of $\epsilon$ and a concatenation of the results. A hybrid argument is used to show that B $(t'',\alpha'')$-breaks the semantic security of $(\epsilon)^l$ for $t'' \approx t$ and $\alpha'' \geq \alpha/(d+1)$, from which the result follows.

For $k \in [0,d]$, let Game k denote a game against $\epsilon^{(d)}$ in which everything is exactly as in the real-world game, except that for all $i \in [1,k]$ the challenger sets $$(sk'_i, pk'_i) \xleftarrow{R} KeyGen_\epsilon(\lambda) \text{ and } \overline{sk'_{ij}} \xleftarrow{R} Encrypt_\epsilon(pk_{i-1}, sk'_{ij})$$

In other words, for $i \in [1,k]$, $\overline{sk'_{ij}}$ is the encryption (under $pk_{i-1}$) of the j-th bit of a random secret key $sk'_i$, unrelated to $sk_i$. Game d+1 is identical to Game d, except that the challenger ignores b and $(\pi_0, \pi_1)$, generates a random plaintext $\pi$ of the appropriate length, and encrypts $\pi$ to construct the challenge ciphertext. Let $\epsilon_k$ denote the adversary's advantage in Game k.

Since Game 0 is identical to the real world attack, the adversary's advantage is $\alpha$ by assumption. Also, $\alpha_{d+1} = 0$, since the challenge is independent of b. Consequently, for some $k \in [0,d]$, it must hold that $|\alpha_k - \alpha_{k+1}| \geq \alpha/(d+1)$; fix this value of k.

B uses A to break $(\epsilon)^l$ as follows. B receives from the challenger a public key pk. B generates the secret and public values exactly as in Game k, except that it replaces its original value of $pk_k$ with pk. Also, if $k<d$, it generates a dummy key pair $$(sk'_{k+1}, pk'_{k+1}) \xleftarrow{R} KeyGen_E(\lambda),$$

sets $\pi_0 \leftarrow sk_{k+1}$ and $\pi_1 \leftarrow sk_{k+1}'$, and requests a challenge ciphertext (under pk) encrypting either $\pi_0, \pi_1 \in P^l$. The challenger generates $$\beta \xleftarrow{R} \{0, 1\}$$

and sends a tuple of ciphertexts $\langle (\psi_j) \rangle$ encrypting the bits $\langle \pi_{\beta j} \rangle$. B replaces its original tuple $\langle \overline{sk_{(k+1)j}} \rangle$ with the tuple $\langle \psi_j \rangle$. One can verify that the public values are generated exactly as in Game k+β. B sends the public values to A.

Eventually, A requests a challenge ciphertext on $\pi_0$ or $\pi_1$. B sets $$b \xleftarrow{R} \{0, 1\}.$$

If $k<d$ B sends the values $$\psi_j \xleftarrow{R} Encrypt_\epsilon(pk_d, \pi_{bj}).$$

If k=d, B generates random $$\pi \xleftarrow{R} P$$

and asks the challenger for a challenge ciphertext on $\pi_b$ or $\pi$. The challenger generates $$\beta \xleftarrow{R} \{0, 1\}$$

and encrypts $\pi_b$ or $\pi$ accordingly, and B forwards the challenge to A. A sends a bit b'. B sends bit $\beta' \leftarrow b \oplus b'$ to the challenger. One can verify that the challenge is generated as in Game k+β.

Since B's simulation has the same distribution as Game k+β, and the probability that B outputs 0 is $\epsilon_{k+\beta}$, the result thus follows.

Discussed now is fully homomorphic encryption from KDM-secure bootstrappable encryption.

The length of the public key in $\alpha^{(d)}$ is proportional to d (the depth of the circuits that can be evaluated). It would be preferable to have a construction $\epsilon^*$ where the public key size is completely independent of the circuit depth, a construction that is fully homomorphic rather than merely leveled fully homomorphic. In order to make the public key pk* of $\epsilon^*$ short: for $\epsilon$ key pair (sk,pk), pk* includes only pk and (the "bits" of) sk encrypted under pk. In other words, a cycle is presented (in fact, a self-loop in this example) of encrypted secret keys rather than an acyclic chain. It is clear that $\epsilon^*$ is correct: the recursive algorithm Evaluate$_\epsilon$* works as before, except that the implicit recryptions generate "refreshed" ciphertexts under the same public key.

Using an acyclic chain of encrypted secret keys allows one to base the security of $\epsilon^{(d)}$ on $\epsilon$ using a hybrid argument. However, this hybrid argument breaks down when there is a cycle. In general, a semantically secure encryption scheme is not guaranteed to be KDM-secure, i.e., secure when the adversary can request the encryptions of key-dependent messages, such as the secret key itself. Typically, when proving an encryption scheme semantically secure there is not an obvious attack when the adversary is given the encryption of a key-dependent message. However, KDM-security is highly nontrivial to prove. The problem is precisely that the usual hybrid argument breaks down.

As a review of (a restriction of) the definition of KDM-security, one may state that a scheme $\epsilon$ is KDM-secure if all polynomial-time adversaries A have negligible advantage in the following KDM-security game.

KDM-Security Game.

Setup(λ,n). The challenger sets $$(sk_i, pk_i) \xleftarrow{R} KeyGen(\lambda)$$

for $i \in [0, n-1]$ for integer n=poly(λ). It chooses a random bit $$b \xleftarrow{R} \{0, 1\}.$$

If b=0, then for $i \in [0, n-1]$ and $j \in [1, l]$, it sets $$\overline{sk_{ij}} \xleftarrow{R} Encrypt_\varepsilon(pk_{(i-1) \bmod n}, sk_{ij}),$$

where $sk_{ij}$ is the jth "bit" of $sk_i$. If b=1, it generates the $\overline{sk_{ij}}$ values as encryptions of random secret keys, unrelated to $pk_0$, ..., $pk_{n-1}$. It sends the public keys and encrypted secret keys to A.

Challenge and Guess. Basically as in the semantic security game.

This definition of KDM-security is a restriction of the general setting where A can select multiple functions $f$, and request the encryption of $f(sk_0, \ldots, sk_{n-1})$. However, when $\epsilon$ is a bootstrappable encryption scheme, A can use the cycle of encrypted secret keys in the game to generate the encryption of $f(sk_0, \ldots, sk_{n-1})$ under any $pk_i$, as long as $f$ can be computed in polynomial time. Hence, one only need to consider the restricted setting. The following theorem can thus be presented.

Suppose $\epsilon$ is KDM-secure and also bootstrappable with respect to a universal set of gates $\Gamma$. Then, $\epsilon^*$, obtained from $\epsilon$ as described above (with the self-loop), is semantically secure (and fully homomorphic).

The theorem is a straightforward consequence of the fact that, from any loop of public keys and encrypted secret keys that includes $(pk_0, sk_0)$, one can compute an encryption of $sk_0$ under $pk_0$. It is not apparent that there is any advantage in having pk* contain any cycle of encrypted secret keys other than a self-loop.

Absent proof of KDM-security in the plain model, one way to obtain fully homomorphic encryption from bootstrappable encryption is to assume that the underlying bootstrappable encryption scheme is also KDM-secure. While an encrypted secret key is very useful in a bootstrappable encryption scheme, indeed one may view this as the essence of bootstrappability, no actual attack on a bootstrappable encryption scheme is seen that provides a self-encrypted key.

Above, a fully homomorphic encryption $\epsilon^*$ was constructed from a bootstrappable encryption scheme $\epsilon$ basically by adding a "self-loop", the $\epsilon$ secret key sk encrypted under its corresponding public key pk, to the $\epsilon^*$ public key pk*. It was shown that $\epsilon^*$ should inherit the semantic security of $\epsilon$, under the assumption that $\epsilon$ is KDM-secure, and in particular under the assumption that it is "safe" to reveal a direct encryption of a secret key under its own public key (as opposed to some possibly-less-revealing non-identity function of the secret key). A question that arises is whether it can be shown that $\epsilon^*$ is semantically secure without this assumption.

Evidence of this is now described in the context of the random oracle model. First, given a leveled fully homomorphic scheme $\epsilon^{(d)}$ and a hash function, an intermediate scheme is defined where $\epsilon^{(d)}\dagger$. $\epsilon^{(d)}\dagger$ is the same as $\epsilon^{(d)}$, except for the following. The public key includes a hash function $H: P^h \to P^l$. Also, in KeyGen, one generates $$r \xleftarrow{R} P',$$

sets $$\overline{r_j} \xleftarrow{R} Encrypt_{\varepsilon(d)}(pk^{(d)}, r_j)$$

for $j \in [1/l']$, sets $\sigma \leftarrow H(r) \circ sk_0$, and includes $(\langle \overline{r_j} \rangle, \sigma)$ in the public key. (Assume $\circ$ is some invertible operation such that $a \circ b$ would completely hide $b \in P^l$ if $a \in P^l$ were a one-time pad.) In other words, the $\epsilon^{(d)}\dagger$ public key includes some additional information: an encryption of the secret key $sk_0$, where the encryption uses a hash function that will be treated as a random oracle in the security analysis.

The following two theorems are now proved.

Theorem (A) If $\epsilon^{(d)}$ is semantically secure, then $\epsilon^{(d)} \dagger$ is semantically secure in the random oracle model.

Theorem (B) Suppose $\epsilon$ is leveled circuit-private (in addition to being bootstrappable) and let $\epsilon^{(d)}\dagger$ and $\epsilon^*$ be constructed from $\epsilon$ as described above. Then, if $\epsilon^{(d)}\dagger$ is semantically secure (in the plain model), and the circuit required to compute the hash function H and invert the $\circ$ operation is at most d levels, then $\epsilon^*$ is semantically secure.

This result is unexpected and clearly advantageous, as the scheme $\epsilon^*$ does not contain a hash function, and yet it can be said that it is secure in the random oracle model. Said another way, one scheme is proven secure in the random oracle model, and then a second scheme's security is based on the first scheme, even though the second scheme does not use a hash function.

Consider the Theorem (B) above. This theorem basically states that one can readily construct a KDM-secure encryption scheme in the random oracle model. This is because the random oracle allows the reduction to construct a "fake" ciphertext purportedly encrypting the secret key, such that the adversary learns that it was fake ciphertext only after it has queried the random oracle. This query gives the reduction all of the information that it needs to solve the underlying problem. In the particular case of interest herein, $\epsilon^{(d)}\dagger$ has a loop among $(sk_0, pk_0), \ldots, (sk\ d, pk\ d)$, because $\epsilon^{(d)}$ reveals direct encryption of $sk_i$ under $pk_{i-1}$ for $i \in [1, d]$, and $\epsilon^{(d)}\dagger$ also reveals an indirect encryption $(\langle \overline{r_j} \rangle, \sigma)$ of $sk_0$ under $pk_d$ ("indirect," because encryption in $\epsilon$ does not normally use a hash function). However, the reduction algorithm in the proof of Theorem (A) above will construct $\sigma$ simply as a random string, i.e., it does not actually need to have knowledge of $sk_0$.

Theorem (B) above is perhaps the more surprising result. However, the result is actually a consequence of the fact that: given a correctly constructed $\epsilon^{(d)}\dagger$ public key, the reduction algorithm can generate an $\epsilon$-encryption of $sk_0$ under $pk_0$, as needed for the $\epsilon^*$ public key. A question that arises then is how to generate the latter ciphertext. The reduction algorithm is given $\langle \overline{r_j} \rangle$, an encryption of r under $pk_d$, and it uses the leveled homomorphism and the circuit corresponding to the hash function H to compute a ciphertext that encrypts H(r) from the ciphertext that encrypts r. Then, given that ciphertext and the value of $\sigma = H(r) \circ sk_0$, it computes a ciphertext that encrypts $sk_0$ in the natural way, i.e., directly, rather than with the hash function. It was assumed that the hash function H and the $\circ$ operation can be computed with a circuit of depth at most d; therefore, the leveled homomorphic scheme $\epsilon^{(d)}$ has sufficient levels to evaluate this circuit. Consequently, one obtains a "natural" encryption of $sk_0$ (i.e., under $\epsilon$) under some public key $pk_i$ for $i \geq 0$, and one can then use Recrypt operations to obtain a natural encryption of $sk_0$ under $pk_0$. This ciphertext is an output of $Evaluate_\epsilon$, but circuit privacy guarantees that the ciphertext is distributed as if it were output directly by $Encrypt_\epsilon$.

It can be noted that although one can view $(\langle \overline{r_j} \rangle, \sigma)$ as an "encryption" of $sk_0$, this "encryption" function is not the usual encryption function and it may have a very complex decryption circuit, much more complex than $D_\epsilon$. In particular, one cannot assume that its decryption circuit is in C. For this reason many (d) levels were needed in the leveled scheme to recover $sk_0$, and a self-loop was not used from the outset.

If $\epsilon^*$ is secure in the random oracle model despite not using a hash function, a question that arises is whether this implies that it is secure in the plain model. This is not the case. The obstacle to this conclusion is that random oracles cannot be instantiated in general (e.g., see R. Canetti, O. Goldreich, and S. Halevi. The random oracle methodology, revisited. In Proc. of STOC '98, pages 209-218. ACM, 1998). A bit more specifically, however, the obstacle is that the proof of Theorem (A) above depends on the correctness of the ciphertext ($\langle \overline{r_j} \rangle$, $\sigma$) in $\epsilon^{(d)}\dagger$ to construct (homomorphically) an encryption of $sk_0$ under $pk_0$ as needed for the $\epsilon^*$ public key; however, in the proof of Theorem (A) the ciphertext is not correct (except with negligible probability): the adversary finds out that it was fake only after it has queried r to the random oracle, giving the reduction all the information that it needs.

As a proof of the theorem (A) above let A be an algorithm that attacks the semantic security of $\epsilon^{(d)}\dagger$; from A, and construct an algorithm B that attacks the semantic security of $\epsilon^{(d)}$. Algorithm B will actually request l'+1 challenge ciphertexts; thus, the reduction loses a factor of l'+1 under the usual hybrid argument.

The challenger gives algorithm B a $\epsilon^{(d)}$ public key. It also sets a bit $$b \xleftarrow{R} \{0,1\}.$$

Algorithm B selects two messages $r^{(0)}, r^{(1)} \in P^{l'}$ and sends them to the challenger. The challenger sets $$\Psi \xleftarrow{R} \{Encrypt(pk_d, r_j^{(b)}): j \in [1, l']\}$$

and sends back $\Psi$. The following is included in the public key that algorithm B sends to algorithm A: the public key for $\epsilon^{(d)}$ sent by the challenger, the set of ciphertexts $\Psi$, and $$\sigma \xleftarrow{R} P^l.$$

Algorithm A requests a challenge ciphertext on one $\pi_0$, $\pi_1 \in P$, and algorithm B forwards the query to the challenger, who responds with a ciphertext encrypting $\pi_b$, which algorithm B forwards to algorithm A.

Eventually, either algorithm A queries some $r' \in \{r^{(0)}, r^{(1)}\}$ to the random oracle, or algorithm A finishes with a guess b'. In the former case, algorithm B sets b' so that $r' = r^{(b')}$. In either case, algorithm B sends b' as its guess to the challenger.

Let p be the probability that algorithm A queries some $r' \in \{r^{(0)}, r^{(1)}\}$ to the random oracle. The simulation of algorithm B appears perfect to algorithm A if it does not query some $r' \in \{r^{(0)}, r^{(1)}\}$; in this case, which occurs with probability 1−p, the advantage of algorithm A advantage is at least α. Since the view of algorithm A is independent of $r^{(1-b)}$, the probability that it queries $r^{(b)}$ to the random oracle is at least p p−$q_H$/|P|$^h$, where $q_H$ is the number of random oracle queries make by algorithm A. Overall, the advantage of algorithm B in guessing b' is at least $(1-p)\alpha + p - q_H/|P|^h \geq \alpha - q_H/|P|^h$.

Provided now is a proof of the theorem (B) above. This proof is essentially a simple consequence of the fact that, given a public key for $\epsilon^{(d)}\dagger$, it is possible to readily generate the public key for $\epsilon^*$ homomorphically.

Let A be an algorithm that breaks the semantic security of $\epsilon^*$, and use algorithm A to construct an algorithm B that breaks the semantic security of $\epsilon^{(d)}\dagger$.

Algorithm B receives a $\epsilon^{(d)}\dagger$ public key from the challenger. This public key consists of $\langle pk_i \rangle_{i \in [0,\delta]}$, $\langle \overline{sk_{ij}} \rangle_{i \in [0,\delta]}$, $\langle \overline{r_j} \rangle_{j \in [1,l']}$, and $\sigma = H(r) \circ sk_0$. From $\langle \overline{r_j} \rangle$, algorithm B uses the homomorphism of $\epsilon^{(d)}$ to compute ciphertexts $\Psi$ that encrypt H(r). It encrypts σ, and then uses the homomorphism to recover or obtain an encryption of $sk_0$ from the encryptions of H(r) and σ (inverting the operation). By assumption, these homomorphic operations take at most d levels. If they require only δ<d levels, and an encryption of $sk_0$ under $pk_{d-\delta}$ is obtained, then one can perform Recrypt operations until one obtains the desired encryption of $sk_0$ under $pk_0$. By circuit privacy, this ciphertext is distributed properly. Algorithm B includes the encryption of $sk_0$ under $pk_0$ as the encrypted secret key contained in the public key for $\epsilon^*$ that it provides to algorithm A.

Algorithm A requests a challenge ciphertext on one $\pi_0, \pi_1 \in P$. Algorithm B forwards the query to the challenger, who responds with a ciphertext encrypting $\pi_b$. Algorithm B uses Recrypt operations to obtain an encryption of $\pi_b$ under $pk_0$ and forwards the result to algorithm A which sends a guess b', and which algorithm B forwards to the challenger. Clearly, the advantage of algorithm B is the same as the advantage of algorithm A.

It should be appreciated that as employed herein the "circuit C" can be, for example, a Boolean circuit with AND, OR, and/or NOT gates (and/or NAND gates as discussed above), or an arithmetic circuit with ADD, MULT and NEGATION functions, or a combination of Boolean gates and arithmetic functions. In general, it is assumed that any function of interest can be expressed as a circuit. The bootstrappable encryption scheme in accordance with the exemplary embodiments of this invention can accommodate a wide range of circuits and circuit functions, and is not limited for use with only, for example, the evaluation of circuits containing multiplication functions (e.g., RSA) or exclusive OR functions (e.g., Goldwasser-Micali).

Figure 3:
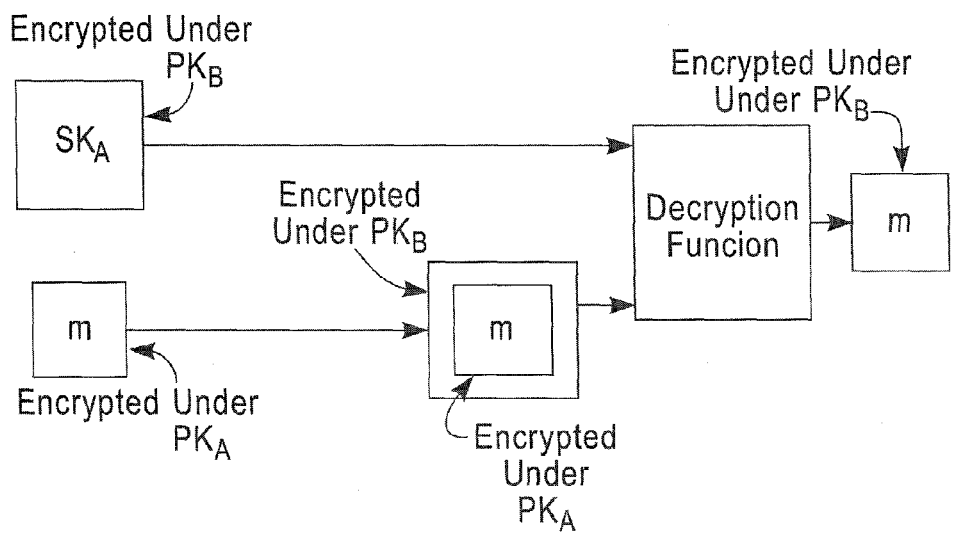
FIG. 3 shows an example of homomorphically evaluating a decryption circuit.
Figure 4:
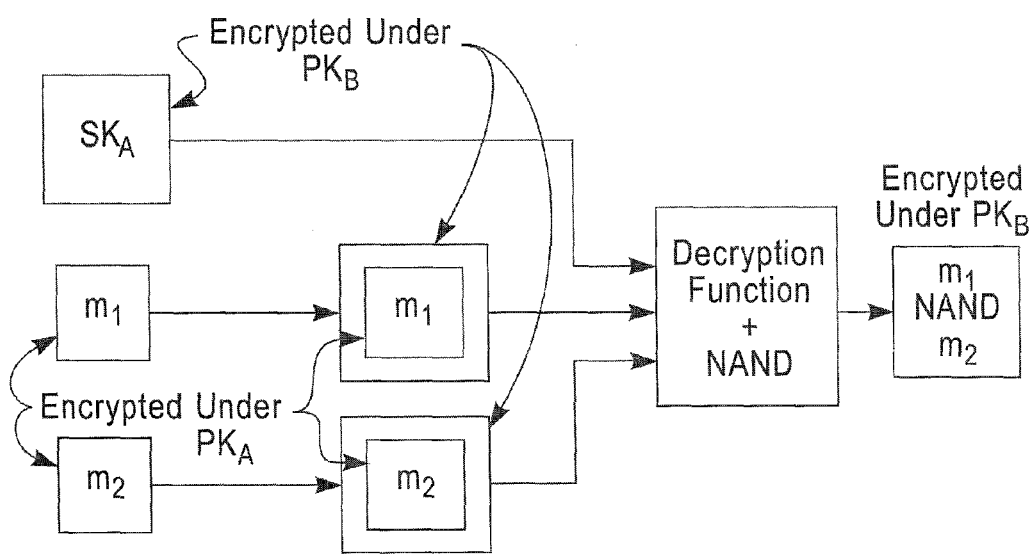
FIG. 4 shows an example of homomorphically evaluating a decryption circuit augmented with an operation, such as a NAND logic function.

FIG. 3 shows an example of homomorphically evaluating a decryption circuit using public keys $PK_A$ and $PK_B$. FIG. 4 shows an example of homomorphically evaluating a decryption circuit augmented with an operation, such as a NAND logic function. Note in FIGS. 3 and 4 that m is encrypted under $PK_A$, which in turn is encrypted under $PK_B$. FIG. 5 shows another example of homomorphically evaluating the decryption circuit augmented with an operation, and in this further embodiment for the case of $m_1$, $m_2$, $m_3$ and $m_4$. Note in FIGS. 4 and 5 that the NAND function is provided as a non-limiting example, and other logical or arithmetic function(s) could be used as well.

FIG. 6 may be viewed as summarizing certain elements of the description appearing above, and illustrates an informal theorem for circuits of arbitrary depth.

Figure 7A:
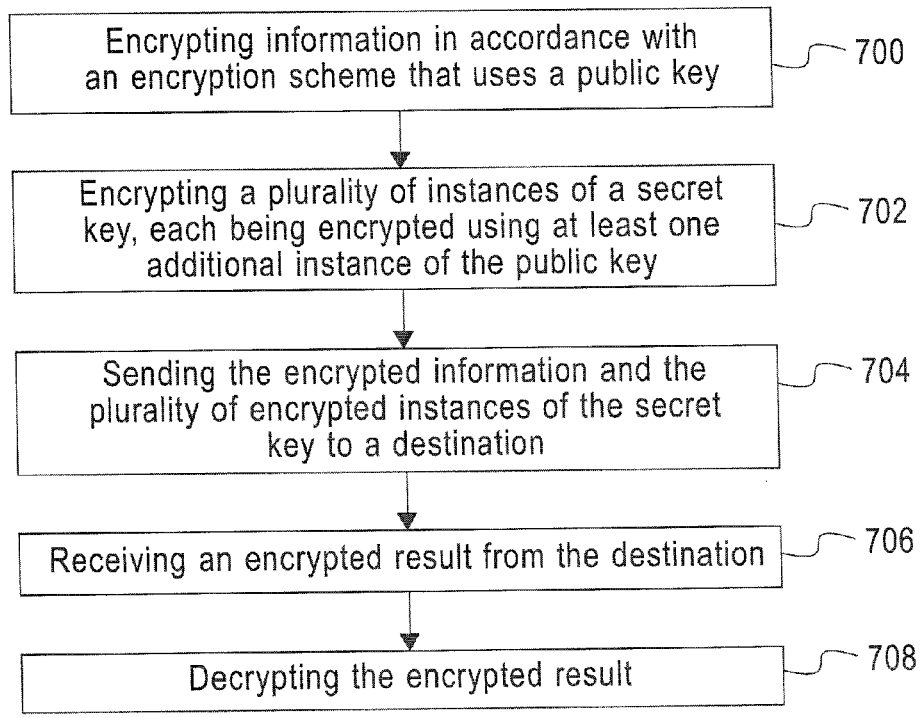
FIGS. 7A and 7B, collectively referred to as FIG. 7, are each a logic flow diagram illustrative of the operation of a method, and the operation of a computer program, in accordance with the exemplary embodiments of this invention.
Figure 7B:
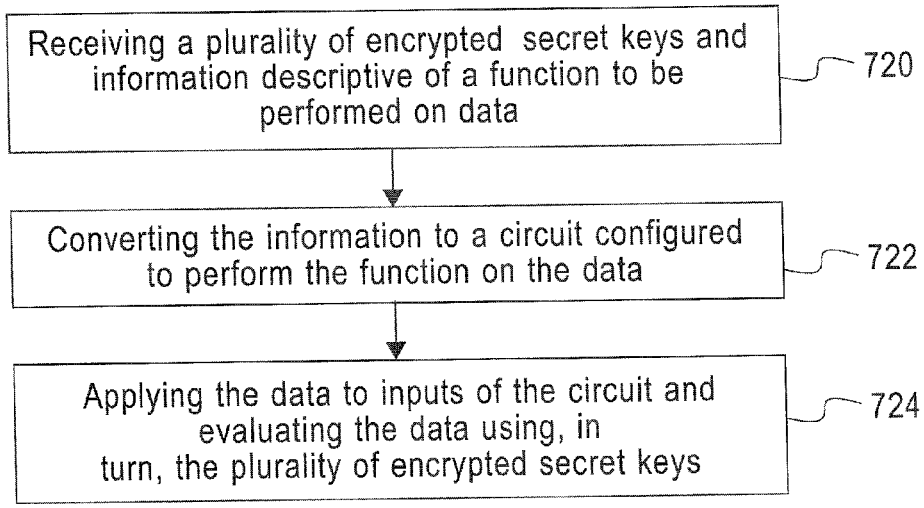

FIGS. 7A and 7B are each a logic flow diagram illustrative of the operation of a method, and the operation of a computer program, in accordance with the exemplary embodiments of this invention.

In FIG. 7A there is a step 700 of encrypting information in accordance with an encryption scheme that uses a public key; a step 702 of encrypting a plurality of instances of a secret key, each being encrypted using at least one additional instance of the public key; a step 704 of sending the encrypted information and the plurality of encrypted instances of the secret key to a destination; a step 706 of receiving an encrypted result from the destination; and a step 708 of decrypting the encrypted result. FIG. 7A may be viewed as being descriptive of the operation of the requestor 1 in FIG. 1.

In FIG. 7B there is a step 720 of receiving a plurality of encrypted secret keys and information descriptive of a function to be performed on data; a step 722 of converting the information to a circuit configured to perform the function on the data; and a step 724 of applying the data to inputs of the circuit and evaluating the data using, in turn, the plurality of encrypted secret keys. FIG. 7B may be viewed as being descriptive of the operation of the server 2 in FIG. 1.

Below are further descriptions of various non-limiting, exemplary embodiments of the invention. The below-described exemplary embodiments are numbered separately for clarity purposes. This numbering should not be construed as entirely separating the various exemplary embodiments since aspects of one or more exemplary embodiments may be practiced in conjunction with one or more other aspects or exemplary embodiments.

(1) In one exemplary embodiment, and as shown in FIG. 7A, a method comprising: encrypting information in accordance with an encryption scheme that uses a public key (700); encrypting a plurality of instances of a secret key, each being encrypted using at least one additional instance of the public key (702); sending the encrypted information and the plurality of encrypted instances of the secret key to a destination (704); receiving an encrypted result from the destination (706); and decrypting the encrypted result (708).

A method as above, where a number of instances of the encrypted secret key is related to a function to be performed on the information. A method as in any above, where a number of instances of the encrypted secret key is related to a number of levels of a circuit used to compute a function to be performed on the information. A method as in any above, where the encrypted result comprises an output of a search engine. A method as in any above, where the encrypted result comprises information related to one or more files stored at the destination. A method as in any above, where the encrypted result comprises an output of a spam filter applied to encrypted messages at the destination. A method as in any above, where encrypting the plurality of instances of the secret key is further in accordance with the encryption scheme. A method as in any above, where the public key corresponds to the secret key (e.g., as in a public key-secret key pair). A method as in any above, implemented as a computer program. A method as in any above, further comprising one or more aspects of the exemplary embodiments of the invention as described herein.

(2) In another exemplary embodiment, a program storage device readable by a machine and tangibly embodying a program of instructions executable by the machine for performing operations comprising: encrypting information in accordance with an encryption scheme that uses a public key (700); encrypting a plurality of instances of a secret key, each being encrypted using at least one additional instance of the public key (702); sending the encrypted information and the plurality of encrypted instances of the secret key to a destination (704); receiving an encrypted result from the destination (706); and decrypting the encrypted result (708).

A program storage device as above, further comprising one or more aspects of the exemplary embodiments of the invention as described herein.

(3) In a further exemplary embodiment, an apparatus comprising: at least one processor configured to encrypt information in accordance with an encryption scheme that uses a public key, where the at least one processor is further configured to encrypt a plurality of instances of a secret key, each being encrypted using at least one additional instance of the public key; at least one transmitter configured to send the encrypted information and the plurality of encrypted instances of the secret key to a destination; and a received configured to receive an encrypted result from the destination, where the at least one processor is further configured to decrypt the encrypted result.

An apparatus as above, where the apparatus comprises a computer. An apparatus as in any above, further comprising one or more aspects of the exemplary embodiments of the invention as described herein.

(4) In another exemplary embodiment, an apparatus comprising: first means for encrypting information in accordance with an encryption scheme that uses a public key; second means for encrypting a plurality of instances of a secret key, each being encrypted using at least one additional instance of the public key; means for sending the encrypted information and the plurality of encrypted instances of the secret key to a destination; means for receiving an encrypted result from the destination; and means for decrypting the encrypted result.

An apparatus as above, where the first means for encrypting comprises at least one of the second means for encrypting and the means for decrypting. An apparatus as in any above, where the first means for encrypting, the second means for encrypting and the means for decrypting comprise at least one processor, the means for sending comprises at least one transmitter and the means for receiving comprises at least one receiver. An apparatus as in any above, further comprising one or more aspects of the exemplary embodiments of the invention as described herein.

(5) In a further exemplary embodiment, an apparatus comprising: first encryption circuitry configured to encrypt information in accordance with an encryption scheme that uses a public key; second encryption circuitry configured to encrypt a plurality of instances of a secret key, each being encrypted using at least one additional instance of the public key; first communications circuitry configured to send the encrypted information and the plurality of encrypted instances of the secret key to a destination; second communications circuitry configured to receive an encrypted result from the destination; and decryption circuitry configured to decrypt the encrypted result.

An apparatus as above, further comprising one or more aspects of the exemplary embodiments of the invention as described herein.

(6) In another exemplary embodiment, and as shown in FIG. 7B, a method comprising: receiving a plurality of encrypted secret keys and information descriptive of a function to be performed on data (720); converting the information to a circuit configured to perform the function on the data (722); and applying the data to inputs of the circuit and evaluating the data using, in turn, the plurality of encrypted secret keys (724).

A method as above, where the plurality of secret keys are each encrypted using one of a plurality of public keys. A method as in any above, where the received information is encrypted using a first public key, and where the plurality of secret keys are each encrypted using one of a plurality of additional public keys. A method as in any above, where a number of received encrypted secret keys is related to a number of levels of the circuit. A method as in any above, implemented as a computer program. A method as in any above, further comprising one or more aspects of the exemplary embodiments of the invention as described herein.

(7) In a further exemplary embodiment, a program storage device readable by a machine and tangibly embodying a program of instructions executable by the machine for performing operations comprising: receiving a plurality of encrypted secret keys and information descriptive of a function to be performed on data (720); converting the information to a circuit configured to perform the function on the data (722); and applying the data to inputs of the circuit and evaluating the data using, in turn, the plurality of encrypted secret keys (724).

A program storage device as above, further comprising one or more aspects of the exemplary embodiments of the invention as described herein.

(8) In another exemplary embodiment, an apparatus comprising: at least one receiver configured to receive a plurality of encrypted secret keys and information descriptive of a function to be performed on data; and at least one processor configured to convert the information to a circuit configured to perform the function on the data, where the at least one processor is further configured to apply the data to inputs of the circuit and to evaluate the data using, in turn, the plurality of encrypted secret keys.

An apparatus as above, further comprising one or more aspects of the exemplary embodiments of the invention as described herein.

(9) In a further exemplary embodiment, an apparatus comprising: means for receiving a plurality of encrypted secret keys and information descriptive of a function to be performed on data; means for converting the information to a circuit configured to perform the function on the data; and means for applying the data to inputs of the circuit and for evaluating the data using, in turn, the plurality of encrypted secret keys.

An apparatus as above, where the means for receiving comprises at least one receiver and the means for converting and the means for applying and evaluating comprise at least one processor. An apparatus as in any above, further comprising one or more aspects of the exemplary embodiments of the invention as described herein.

(10) In another exemplary embodiment, an apparatus comprising: reception circuitry configured to receive a plurality of encrypted secret keys and information descriptive of a function to be performed on data; conversion circuitry configured to convert the information to a circuli configured to perform the function on the data; and evaluation circuitry configured to apply the data to inputs of the circuit and evaluate the data using, in turn, the plurality of encrypted secret keys.

An apparatus as above, further comprising one or more aspects of the exemplary embodiments of the invention as described herein.

Figure 9:
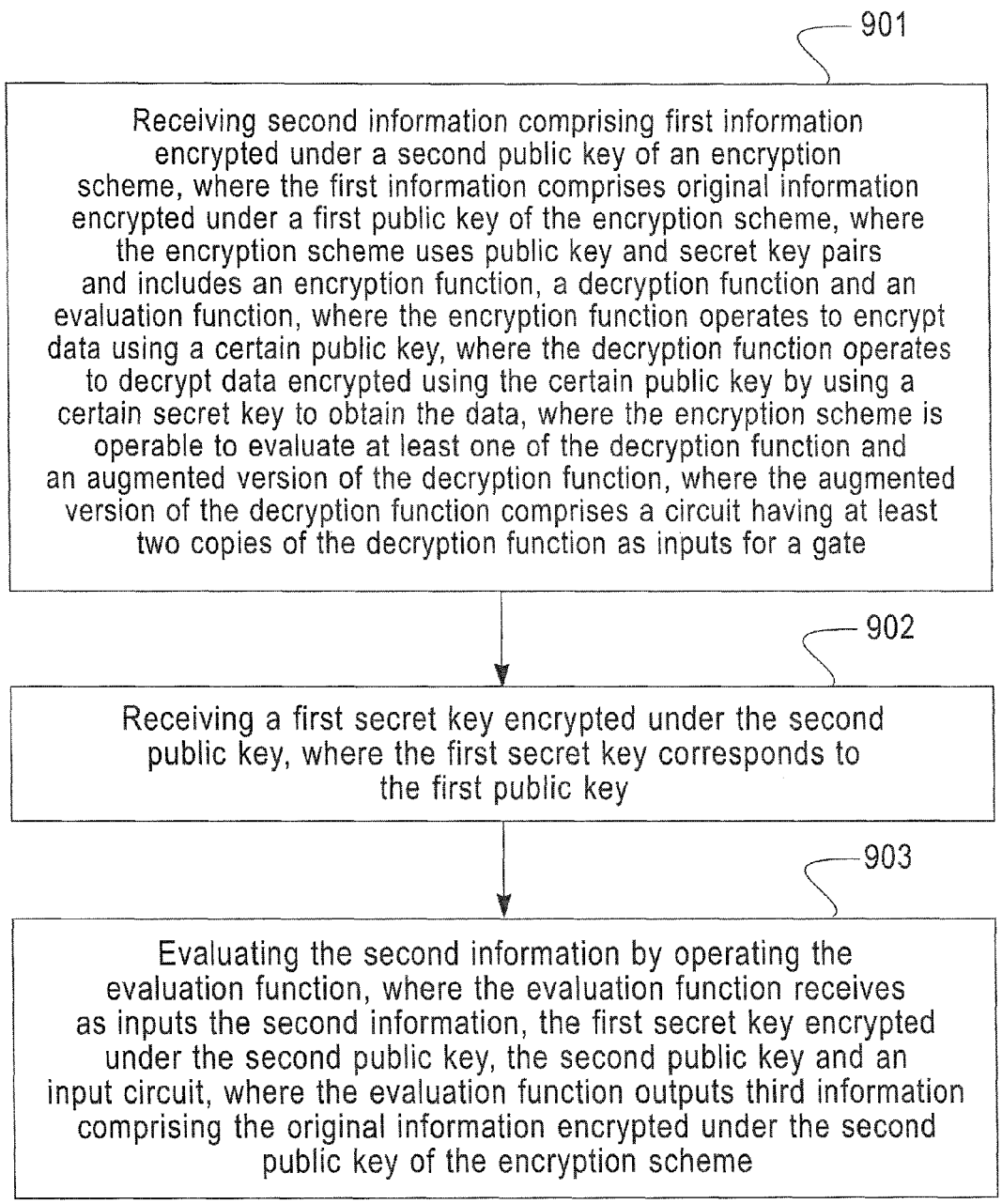
FIG. 9 illustrates a block diagram of a method in an accordance of a certain embodiment of the invention.

(11) In a further exemplary embodiment, and as shown in FIG. 9, a method comprising: receiving second information comprising first information encrypted under a second public key of an encryption scheme, where the first information comprises original information encrypted under a first public key of the encryption scheme, where the encryption scheme uses public key and secret key pairs and includes an encryption function, a decryption function and an evaluation function, where the encryption function operates to encrypt data using a certain public key, where the decryption function operates to decrypt data encrypted using the certain public key by using a certain secret key to obtain the data, where the encryption scheme is operable to evaluate at least one of the decryption function and an augmented version of the decryption function, where the augmented version of the decryption function comprises a circuit having at least two copies of the decryption function as inputs for a gate (901); receiving a first secret key encrypted under the second public key, where the first secret key corresponds to the first public key (902); and evaluating the second information by operating the evaluation function, where the evaluation function receives as inputs the second information, the first secret key encrypted under the second public key, the second public key and an input circuit, where the evaluation function outputs third information comprising the original information encrypted under the second public key of the encryption scheme (903).

A method as above, where the encryption scheme is fully homomorphic and the evaluation function enables bootstrapping by converting the input circuit into a converted circuit comprising at least one of the decryption function and the augmented version of the decryption function. A method as in any above, where the first public key comprises the second public key and the first secret key comprises the second secret key. A method as in any above, implemented as a computer program. A method as in any above, further comprising one or more aspects of the exemplary embodiments of the invention as described herein.

(12) In another exemplary embodiment, a program storage device readable by a machine and tangibly embodying a program of instructions executable by the machine for performing operations comprising: receiving second information comprising first information encrypted under a second public key of an encryption scheme, where the first information comprises original information encrypted under a first public key of the encryption scheme, where the encryption scheme uses public key and secret key pairs and includes an encryption function, a decryption function and an evaluation function, where the encryption function operates to encrypt data using a certain public key, where the decryption function operates to decrypt data encrypted using the certain public key by using a certain secret key to obtain the data, where the encryption scheme is operable to evaluate at least one of the decryption function and an augmented version of the decryption function, where the augmented version of the decryption function comprises a circuit having at least two copies of the decryption function as inputs for a gate (901); receiving a first secret key encrypted under the second public key, where the first secret key corresponds to the first public key (902); and evaluating the second information by operating the evaluation function, where the evaluation function receives as inputs the second information, the first secret key encrypted under the second public key, the second public key and an input circuit, where the evaluation function outputs third information comprising the original information encrypted under the second public key of the encryption scheme (903).

A program storage device as above, further comprising one or more aspects of the exemplary embodiments of the invention as described herein.

(13) In a further exemplary embodiment, an apparatus comprising: at least one receiver configured to receive second information comprising first information encrypted under a second public key of an encryption scheme, where the first information comprises original information encrypted under a first public key of the encryption scheme, where the encryption scheme uses public key and secret key pairs and includes an encryption function, a decryption function and an evaluation function, where the encryption function operates to encrypt data using a certain public key, where the decryption function operates to decrypt data encrypted using the certain public key by using a certain secret key to obtain the data, where the encryption scheme is operable to evaluate at least one of the decryption function and an augmented version of the decryption function, where the augmented version of the decryption function comprises a circuit having at least two copies of the decryption function as inputs for a gate, where the at least one receiver is further configured to receive a first secret key encrypted under the second public key, where the first secret key corresponds to the first public key; and at least one processor configured to evaluate the second information by operating the evaluation function, where the evaluation function receives as inputs the second information, the first secret key encrypted under the second public key, the second public key and an input circuit, where the evaluation function outputs third information comprising the original information encrypted under the second public key of the encryption scheme.

An apparatus as above, further comprising one or more aspects of the exemplary embodiments of the invention as described herein.

(14) In another exemplary embodiment, an apparatus comprising: first means for receiving second information comprising first information encrypted under a second public key of an encryption scheme, where the first information comprises original information encrypted under a first public key of the encryption scheme, where the encryption scheme uses public key and secret key pairs and includes an encryption function, a decryption function and an evaluation function, where the encryption function operates to encrypt data using a certain public key, where the decryption function operates to decrypt data encrypted using the certain public key by using a certain secret key to obtain the data, where the encryption scheme is operable to evaluate at least one of the decryption function and an augmented version of the decryption function, where the augmented version of the decryption function comprises a circuit having at least two copies of the decryption function as inputs for a gate; second means for receiving a first secret key encrypted under the second public key, where the first secret key corresponds to the first public key; and means for evaluating the second information by operating the evaluation function, where the evaluation function receives as inputs the second information, the first secret key encrypted under the second public key, the second public key and an input circuit, where the evaluation function outputs third information comprising the original information encrypted under the second public key of the encryption scheme.

An apparatus as above, where the means for evaluating comprises at least one processor and the first means for receiving and the second means for receiving comprise at least one receiver. An apparatus as in any above, further comprising one or more aspects of the exemplary embodiments of the invention as described herein.

(15) In a further exemplary embodiment, an apparatus comprising: first reception circuitry configured to receive second information comprising first information encrypted under a second public key of an encryption scheme, where the first information comprises original information encrypted under a first public key of the encryption scheme, where the encryption scheme uses public key and secret key pairs and includes an encryption function, a decryption function and an evaluation function, where the encryption function operates to encrypt data using a certain public key, where the decryption function operates to decrypt data encrypted using the certain public key by using a certain secret key to obtain the data, where the encryption scheme is operable to evaluate at least one of the decryption function and an augmented version of the decryption function, where the augmented version of the decryption function comprises a circuit having at least two copies of the decryption function as inputs for a gate; second reception circuitry configured to receive a first secret key encrypted under the second public key, where the first secret key corresponds to the first public key; and evaluation circuitry configured to evaluate the second information by operating the evaluation function, where the evaluation function receives as inputs the second information, the first secret key encrypted under the second public key, the second public key and an input circuit, where the evaluation function outputs third information comprising the original information encrypted under the second public key of the encryption scheme.

An apparatus as above, further comprising one or more aspects of the exemplary embodiments of the invention as described herein.

The exemplary embodiments of the invention, as discussed herein and as particularly described with respect to exemplary methods, may be implemented in conjunction with a program storage device (e.g., at least one memory, at least one computer-readable medium) readable by a machine (e.g., a processor, a computer), tangibly embodying a program of instructions (e.g., a program or computer program) executable by the machine for performing operations. The operations comprise steps of utilizing the exemplary embodiments or steps of the method.

The blocks shown in FIGS. 7 and 9 further may be considered to correspond to one or more functions and/or operations that are performed by one or more components, circuits, chips, apparatus, processors, computer programs and/or function blocks. Any and/or all of the above may be implemented in any practicable solution or arrangement that enables operation in accordance with the exemplary embodiments of the invention as described herein.

In addition, the arrangement of the blocks depicted in FIGS. 7 and 9 should be considered merely exemplary and non-limiting. It should be appreciated that the blocks shown in FIGS. 7 and 9 may correspond to one or more functions and/or operations that may be performed in any order (e.g., any suitable, practicable and/or feasible order) and/or concurrently (e.g., as suitable, practicable and/or feasible) so as to implement one or more of the exemplary embodiments of the invention. In addition, one or more additional functions, operations and/or steps may be utilized in conjunction with those shown in FIGS. 7 and 9 so as to implement one or more further exemplary embodiments of the invention.

That is, the exemplary embodiments of the invention shown in FIGS. 7 and 9 may be utilized, implemented or practiced in conjunction with one or more further aspects in any combination (e.g., any combination that is suitable, practicable and/or feasible) and are not limited only to the steps, blocks, operations and/or functions shown in FIGS. 7 and 9.

Still further, the various names used for variables, parameters and the like are not intended to be limiting in any respect, as these parameters may be identified by any suitable name.

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and/or non-volatile memory devices (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.), as non-limiting examples. Code in the computer readable medium is accessed and executed by a processor. A transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed.

Those skilled in the art will recognize that many modifications may be made without departing from the scope of embodiments, and that the article of manufacture may comprise any information bearing medium. For example, the article of manufacture may comprise a storage medium having stored therein instructions that, when executed by a machine, result in operations being performed.

Certain embodiments can take the form of an entirely hardware embodiment, an entirely software embodiment or an embodiment containing both hardware and software elements. The invention can be implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/VV) and digital video disc (DVD).

The terms "certain embodiments", "an embodiment", "embodiment", "exemplary embodiment", "embodiments", "exemplary embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Any use of the terms "connected," "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
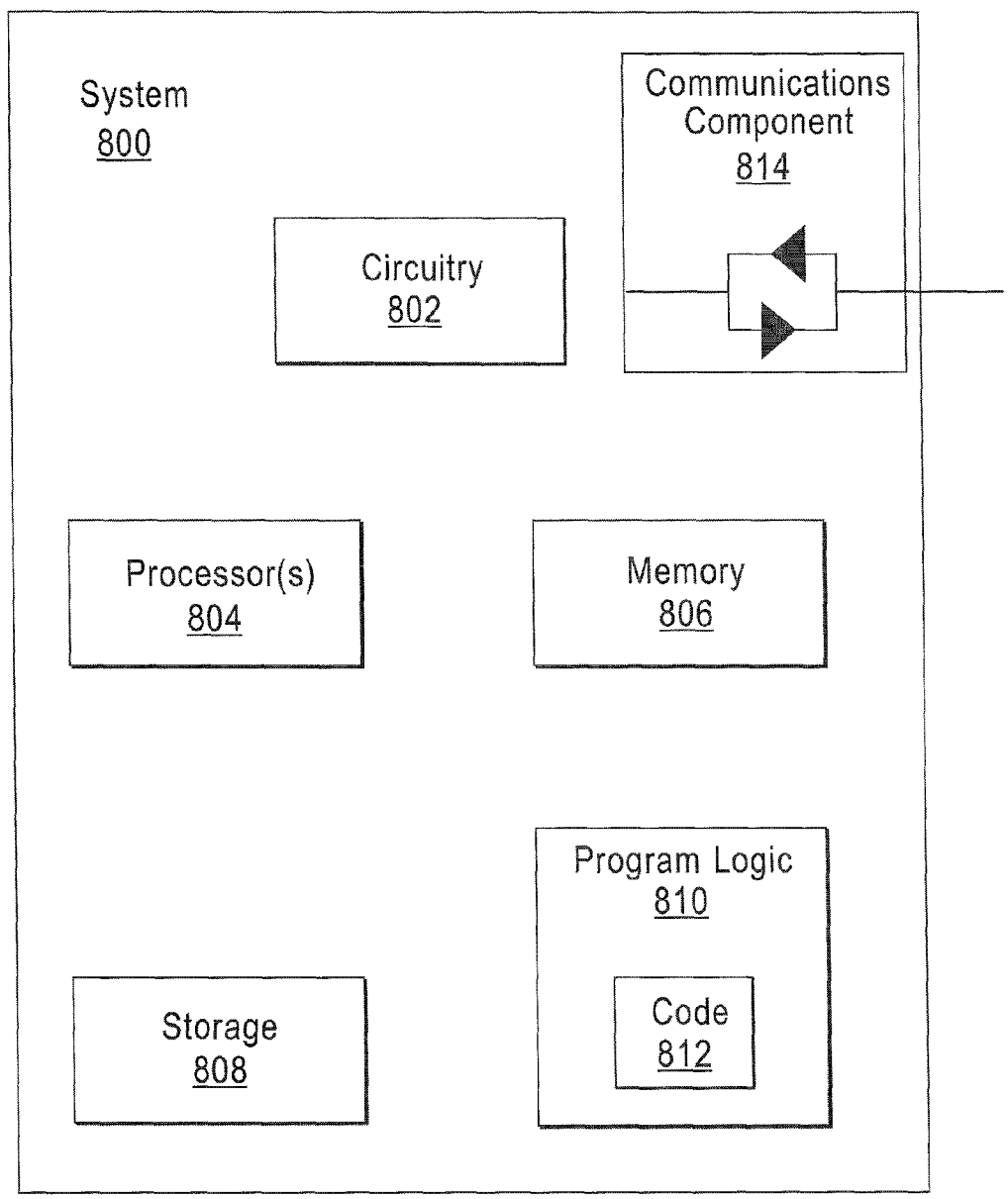
FIG. 8 illustrates a block diagram of a system in which certain embodiments may be implemented.

FIG. 8 illustrates a block diagram of a system 800 in which certain embodiments may be implemented. In certain embodiments, the requestor and server blocks 1 and 2 shown in FIG. 1 may each be implemented in accordance with the system 800. The system 800 may include at least one circuitry 802 that may in certain embodiments include at least one processor 804. The system 800 may also include at least one memory 806 (e.g., a volatile memory device), and/or at least one storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include at least one program logic 810 including code 812 that may be loaded into the memory 806 and executed by the processor 804 and/or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802. The system 800 may include at least one communications component 814 that enables communication with at least one other system, device and/or apparatus. The communications component 814 may include a transceiver configured to send and receive information, a transmitter configured to send information and/or a receiver configured to receive information. As a non-limiting example, the communications component 814 may comprise a modem or network card. The system 800 of FIG. 8 may be embodied in a computer or computer system, such as a desktop computer, a portable computer or a server, as non-limiting examples. The components of the system 800 shown in FIG. 8 may be connected or coupled together using one or more internal buses, connections, wires and/or (printed) circuit boards, as non-limiting examples.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

Any data structures and components shown or referred to in the other Figures and in the specification are described as having specific types of information. In alternative embodiments, the data structures and components may be structured differently and have fewer, more or different fields or different functions than those shown or referred to in the Figures.

Therefore, the foregoing description of the embodiments has been presented for the purposes of illustration and description. It is not intended to be exhaustive or to limit the embodiments to the precise form disclosed. Many modifications and variations are possible in light of the above teaching

What is claimed is:

1. A method, comprising:
   receiving second information comprising first information encrypted under a second public key of an encryption scheme, where the first information comprises original information encrypted under a first public key of the encryption scheme, where the encryption scheme uses public key and secret key pairs and includes an encryption function, a decryption function and an evaluation function, where the encryption function operates to encrypt data using a certain public key, where the decryption function operates to decrypt data encrypted using the certain public key by using a certain secret key to obtain the data, where the encryption scheme is configured to evaluate at least one of the decryption function and an augmented version of the decryption function, where the augmented version of the decryption function comprises a circuit having at least two copies of the decryption function as inputs for a gate;
   receiving a first secret key encrypted under the second public key, where the first secret key corresponds to the first public key; and
   evaluating the second information by operating the evaluation function, where the evaluation function receives as inputs the second information, the first secret key encrypted under the second public key, the second public key and an input circuit, where the evaluation function outputs third information comprising the original information encrypted under the second public key of the encryption scheme.

2. The method of claim 1, where the encryption scheme is fully homomorphic and the evaluation function performs bootstrapping by converting the input circuit into a converted circuit comprising at least one of the decryption function and the augmented version of the decryption function, and where the evaluation function evaluates the second information using at least the converted circuit to produce the third information.

3. The method of claim 1, where the first public key comprises the second public key and the first secret key comprises the second secret key.

4. The method of claim 1, where the third information comprises an output of a search engine.

5. The method of claim 1, where the third information comprises information related to at least one stored file.

6. A computer-readable storage device tangibly embodying a program of instructions executable by a computer for performing operations comprising:
   receiving second information comprising first information encrypted under a second public key of an encryption scheme, where the first information comprises original information encrypted under a first public key of the encryption scheme, where the encryption scheme uses public key and secret key pairs and includes an encryption function, a decryption function and an evaluation function, where the encryption function operates to encrypt data using a certain public key, where the decryption function operates to decrypt data encrypted using the certain public key by using a certain secret key to obtain the data, where the encryption scheme is configured to evaluate at least one of the decryption function and an augmented version of the decryption function, where the augmented version of the decryption function comprises a circuit having at least two copies of the decryption function as inputs for a gate;
   receiving a first secret key encrypted under the second public key, where the first secret key corresponds to the first public key; and
   evaluating the second information by operating the evaluation function, where the evaluation function receives as inputs the second information, the first secret key encrypted under the second public key, the second public key and an input circuit, where the evaluation function outputs third information comprising the original information encrypted under the second public key of the encryption scheme.

7. The computer-readable storage device of claim 6, where the encryption scheme is fully homomorphic and the evaluation function performs bootstrapping by converting the input circuit into a converted circuit comprising at least one of the decryption function and the augmented version of the decryption function, and where the evaluation function evaluates the second information using at least the converted circuit to produce the third information.

8. The computer-readable storage device of claim 6, where the first public key comprises the second public key and the first secret key comprises the second secret key.

9. The computer-readable storage device of claim 6, where the third information comprises an output of a search engine.

10. The computer-readable storage device of claim 6, where the third information comprises information related to at least one stored file.

11. An apparatus, comprising:
    one or more processors;
    one or more memories comprising program code,
    wherein the one or more processors, in response to execution of the program code, control the apparatus to perform at least the following:
    receiving second information comprising first information encrypted under a second public key of an encryption scheme, where the first information comprises original information encrypted under a first public key of the encryption scheme, where the encryption scheme uses public key and secret key pairs and includes an encryption function, a decryption function and an evaluation function, where the encryption function operates to encrypt data using a certain public key, where the decryption function operates to decrypt data encrypted using the certain public key by using a certain secret key to obtain the data, where the encryption scheme is configured to evaluate at least one of the decryption function and an augmented version of the decryption function, where the augmented version of the decryption function comprises a circuit having at least two copies of the decryption function as inputs for a gate;

receiving a first secret key encrypted under the second public key, where the first secret key corresponds to the first public key; and evaluating the second information by operating the evaluation function, where the evaluation function receives as inputs the second information, the first secret key encrypted under the second public key, the second public key and an input circuit, where the evaluation function outputs third information comprising the original information encrypted under the second public key of the encryption scheme.

12. The apparatus of claim 11, where the encryption scheme is fully homomorphic and the evaluation function performs bootstrapping by converting the input circuit into a converted circuit comprising at least one of the decryption function and the augmented version of the decryption function, and where the evaluation function evaluates the second information using at least the converted circuit to produce the third information.

13. The apparatus of claim 11, where the first public key comprises the second public key and the first secret key comprises the second secret key.

14. The apparatus of claim 11, where the third information comprises an output of a search engine.

15. The apparatus of claim 11, where the third information comprises information related to at least one stored file.

* * * * *